United States Patent
Waide et al.

(10) Patent No.: US 12,473,087 B2
(45) Date of Patent: *Nov. 18, 2025

(54) BATTERY AND ENGINE ARCHITECTURE FOR VTOL AIRCRAFT

(71) Applicant: Archer Aviation Inc., San Jose, CA (US)

(72) Inventors: William Martin Waide, Central Point, OR (US); Abraham Karem, Santa Ana, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/209,431

(22) Filed: May 15, 2025

(65) Prior Publication Data

US 2025/0269954 A1 Aug. 28, 2025

Related U.S. Application Data

(60) Continuation of application No. 17/513,804, filed on Oct. 28, 2021, which is a continuation of application
(Continued)

(51) Int. Cl.
*B64C 29/00* (2006.01)
*B64C 3/10* (2006.01)
(Continued)

(52) U.S. Cl.
CPC ............ *B64C 29/0033* (2013.01); *B64C 3/10* (2013.01); *B64C 3/16* (2013.01); *B64C 5/02* (2013.01);
(Continued)

(58) Field of Classification Search
CPC ......... B64C 29/0033; B64C 3/10; B64C 3/16; B64C 5/02; B64C 9/18; B64C 13/18;
(Continued)

(56) References Cited

U.S. PATENT DOCUMENTS 2,957,364 A * 10/1960 Villeple ............... F16H 61/0293
477/121
3,502,290 A * 3/1970 Legrand .................. F16F 15/04
248/560
(Continued)

FOREIGN PATENT DOCUMENTS

CA 2315524 5/2001
CA 15985507 5/2001
(Continued)

OTHER PUBLICATIONS

PCT International Search Report and Written Opinion PCT/US2018/033744; Sep. 12, 2018.
(Continued)

*Primary Examiner* — Medhat Badawi
(74) *Attorney, Agent, or Firm* — Finnegan, Henderson, Farabow, Garrett & Dunner, LLP

(57) ABSTRACT

Apparatus, systems, and methods are contemplated for electric powered vertical takeoff and landing (eVTOL) aircraft. Such are craft are engineered to carry safely carry at least 500 pounds (approx. 227 kg) using a few (e.g., 2-4) rotors, generally variable speed rigid (non-articulated) rotors. It is contemplated that one or more rotors generate a significant amount of lift (e.g., 70%) during rotorborne flight (e.g., vertical takeoff, hover, etc), and tilt to provide forward propulsion during wingborne flight. The rotors preferably employ individual blade control, and are battery powered. The vehicle preferably flies in an autopilot or pilotless mode and has a relatively small (e.g., less than 45' diameter) footprint.

30 Claims, 44 Drawing Sheets

Related U.S. Application Data

No. 16/872,017, filed on May 11, 2020, now Pat. No. 11,964,755, which is a division of application No. 16/155,669, filed on Oct. 9, 2018, now Pat. No. 11,066,159, which is a division of application No. 15/985,507, filed on May 21, 2018, now Pat. No. 10,351,235.

(60) Provisional application No. 62/656,971, filed on Apr. 12, 2018, provisional application No. 62/509,666, filed on May 22, 2017, provisional application No. 62/509,674, filed on May 22, 2017.

(51) Int. Cl.
    B64C 3/16      (2006.01)
    B64C 5/02      (2006.01)
    B64C 9/18      (2006.01)
    B64C 13/18     (2006.01)
    B64C 39/12     (2006.01)
    B64D 27/34     (2024.01)
    B64D 35/021    (2024.01)
    B64F 5/00      (2017.01)

(52) U.S. Cl.
    CPC ............... *B64C 9/18* (2013.01); *B64C 13/18* (2013.01); *B64C 39/12* (2013.01); *B64D 27/34* (2024.01); *B64D 35/021* (2024.01); *B64F 5/00* (2013.01)

(58) Field of Classification Search
    CPC ...... B64C 39/12; B64C 27/34; B64D 35/021; B64F 5/00
    See application file for complete search history.

(56) References Cited

U.S. PATENT DOCUMENTS

| | | | | |
|---|---|---|---|---|
| 4,436,483 A * | 3/1984 | Watson | B64C 27/50 | 416/143 |
| 6,007,298 A * | 12/1999 | Karem | B64C 27/04 | 416/223 R |
| 6,276,633 B1 * | 8/2001 | Balayn | B64C 29/0033 | 244/56 |
| 6,322,324 B1 * | 11/2001 | Kennedy | B64C 27/008 | 416/500 |
| 6,641,365 B2 * | 11/2003 | Karem | B64C 27/467 | 416/131 |
| 7,500,935 B2 * | 3/2009 | Waide | B64C 27/14 | 475/336 |
| 7,871,033 B2 | 1/2011 | Karem | | |
| 8,517,302 B2 * | 8/2013 | Karem | B64C 27/28 | 244/12.4 |
| 8,820,674 B2 * | 9/2014 | Cranga | B64C 27/001 | 74/572.4 |
| 8,931,732 B2 * | 1/2015 | Sirohi | B64C 29/00 | 244/17.21 |
| 9,108,727 B2 * | 8/2015 | Hoover | B64C 27/50 | |
| 9,346,542 B2 * | 5/2016 | Leng | B64D 31/12 | |
| 10,011,349 B2 | 7/2018 | Ivans | | |
| 10,053,213 B1 * | 8/2018 | Tu | B64C 27/82 | |
| 10,442,525 B2 * | 10/2019 | Bogrash | B64C 11/20 | |
| 10,598,265 B2 | 3/2020 | Seminel | | |
| 11,014,658 B1 * | 5/2021 | Tesar | B64D 35/00 | |
| 11,072,421 B2 * | 7/2021 | Shi | B64C 29/0033 | |
| 11,203,423 B2 | 12/2021 | Karem | | |
| 11,560,235 B2 * | 1/2023 | Wagner | H02K 11/33 | |
| 11,780,555 B1 * | 10/2023 | Karem | B60V 3/08 | 244/130 |
| 2008/0184906 A1 | 8/2008 | Kejha | | |
| 2009/0256026 A1 * | 10/2009 | Karem | B64C 27/08 | 244/99.2 |
| 2010/0051740 A1 * | 3/2010 | Yoeli | B64U 30/20 | 244/17.23 |
| 2010/0132915 A1 * | 6/2010 | Blanding | H05K 7/20854 | 165/41 |
| 2011/0001020 A1 * | 1/2011 | Forgac | B64C 29/0033 | 244/7 A |
| 2011/0024555 A1 * | 2/2011 | Kuhn, Jr. | B64C 29/0033 | 244/17.11 |
| 2011/0168835 A1 * | 7/2011 | Oliver | B64D 27/06 | 244/12.4 |
| 2012/0043413 A1 * | 2/2012 | Smith | B64C 29/0033 | 244/12.4 |
| 2012/0298794 A1 * | 11/2012 | Krysinski | B64C 27/001 | 244/17.27 |
| 2013/0175404 A1 * | 7/2013 | Shefer | B64C 15/14 | 244/7 A |
| 2013/0283899 A1 * | 10/2013 | Plowman | G01M 13/021 | 73/115.02 |
| 2014/0061392 A1 * | 3/2014 | Karem | B64C 11/26 | 244/7 R |
| 2014/0263855 A1 * | 9/2014 | Ross | B64C 29/0033 | 416/134 A |
| 2014/0338372 A1 * | 11/2014 | Muren | F25B 30/04 | 62/467 |
| 2014/0339372 A1 * | 11/2014 | Dekel | G05D 1/0676 | 244/7 R |
| 2015/0104314 A1 * | 4/2015 | Zamponi | B64C 27/473 | 416/134 A |
| 2015/0274292 A1 * | 10/2015 | DeLorean | B64D 27/34 | 244/6 |
| 2015/0314867 A1 * | 11/2015 | Razroev | B64C 39/12 | 244/119 |
| 2015/0344134 A1 * | 12/2015 | Cruz Ayoroa | B64C 29/0033 | 244/48 |
| 2016/0023527 A1 * | 1/2016 | Dietrich | B64D 35/024 | 244/2 |
| 2016/0031555 A1 * | 2/2016 | Bevirt | B64C 27/30 | 244/7 C |
| 2016/0031556 A1 * | 2/2016 | Bevirt | B64D 27/357 | 416/131 |
| 2016/0076629 A1 * | 3/2016 | Modrzejewski | F16H 3/48 | 244/17.11 |
| 2016/0114887 A1 * | 4/2016 | Zhou | H04N 23/51 | 348/148 |
| 2016/0244158 A1 | 8/2016 | Fredericks et al. | | |
| 2016/0304194 A1 * | 10/2016 | Bevirt | B64C 27/08 | |
| 2016/0340038 A1 * | 11/2016 | Chavez | B64D 47/08 | |
| 2017/0088291 A1 * | 3/2017 | Hesse | B64C 25/32 | |
| 2017/0129597 A1 * | 5/2017 | Lauder | B64C 27/46 | |
| 2017/0368608 A1 * | 12/2017 | Homma | B64C 1/40 | |
| 2018/0002011 A1 * | 1/2018 | McCullough | B64C 17/02 | |
| 2018/0002012 A1 * | 1/2018 | McCullough | B64U 10/16 | |
| 2018/0031093 A1 * | 2/2018 | Seminel | G07C 5/0808 | |
| 2018/0057148 A1 * | 3/2018 | Bosworth | B64C 13/18 | |
| 2018/0057159 A1 * | 3/2018 | Ivans | B64C 11/00 | |
| 2018/0079490 A1 * | 3/2018 | Foskey | B64C 29/0033 | |
| 2018/0138766 A1 * | 5/2018 | Moore | B64D 27/34 | |
| 2018/0141671 A1 * | 5/2018 | Anghel | B64D 27/33 | |
| 2018/0155019 A1 * | 6/2018 | Lee | B64C 29/0033 | |
| 2018/0162525 A1 * | 6/2018 | St. Clair | B64C 29/0025 | |
| 2018/0170522 A1 * | 6/2018 | De Wergifosse | B64C 11/44 | |
| 2018/0244383 A1 * | 8/2018 | Valente | B64C 29/0033 | |
| 2018/0273169 A1 | 9/2018 | Ivans | | |
| 2018/0281941 A1 * | 10/2018 | Hutson | B64C 29/0016 | |
| 2018/0283219 A1 * | 10/2018 | Jackowski | F02C 7/32 | |
| 2018/0290742 A1 * | 10/2018 | Oldroyd | B64D 27/404 | |
| 2018/0297698 A1 * | 10/2018 | Dhall | B60F 5/02 | |
| 2018/0334240 A1 * | 11/2018 | Paulson | B64C 27/50 | |
| 2018/0334251 A1 * | 11/2018 | Karem | B64C 5/02 | |
| 2018/0346111 A1 * | 12/2018 | Karem | B64D 27/33 | |
| 2018/0370624 A1 * | 12/2018 | Seale | B64C 29/0033 | |
| 2019/0023382 A1 * | 1/2019 | Welsh | B64C 27/10 | |
| 2019/0031337 A1 * | 1/2019 | McCullough | B64C 17/00 | |
| 2019/0291860 A1 * | 9/2019 | Morgan | B64C 21/00 | |
| 2019/0291862 A1 * | 9/2019 | Lyasoff | B64C 15/12 | |
| 2019/0329882 A1 * | 10/2019 | Baity | B64U 30/14 | |
| 2020/0010187 A1 * | 1/2020 | Bevirt | B64C 29/0033 | |

(56) References Cited

U.S. PATENT DOCUMENTS

| | | | |
|---|---|---|---|
| 2020/0200244 A1 | 6/2020 | Seminel | |
| 2020/0231277 A1* | 7/2020 | Moore | B64C 29/0033 |
| 2020/0361601 A1* | 11/2020 | Mikic | B64U 50/13 |
| 2021/0024208 A1* | 1/2021 | Tao | B64C 11/32 |
| 2021/0229802 A1* | 7/2021 | Karem | B64D 27/31 |
| 2021/0253235 A1* | 8/2021 | Solstin | B64U 50/19 |
| 2022/0048619 A1* | 2/2022 | Waide | B64C 27/28 |
| 2023/0174247 A1* | 6/2023 | Ahyow | B64C 39/08 244/57 |

FOREIGN PATENT DOCUMENTS

| | | |
|---|---|---|
| CA | 2766623 | 8/2012 |
| CN | 201310691329.2 | 12/2013 |
| CN | 103693194 A | 4/2014 |
| CN | 103693194 | 11/2015 |
| CN | 106672232 | 5/2017 |
| EP | 2969603 | 5/2017 |
| EP | 2969603 B1 | 5/2017 |
| EP | 3369652 | 9/2017 |
| EP | 3369655 A1 | 9/2018 |
| EP | 3548377 A1 | 10/2019 |
| GB | 400735 | 12/1931 |
| GB | 2550489 | 11/2017 |
| JP | H0911994 | 6/1995 |
| JP | 2010510930 | 4/2010 |
| JP | 201583456 | 4/2015 |
| JP | 2015526337 | 9/2015 |
| JP | 3201100 | 10/2015 |
| JP | 2013501677 | 1/2019 |
| KR | 1020150058197 | 5/2015 |
| WO | 2008054234 | 5/2008 |
| WO | 2008085195 | 7/2008 |
| WO | 2014144001 A2 | 9/2014 |
| WO | 2017158417 | 9/2017 |
| WO | 2018099856 | 7/2018 |
| WO | 2019232535 | 12/2019 |

OTHER PUBLICATIONS

Elan Head, Behind the controls of an eVTOL aircraft: A test pilot's perspective; https://verticalmag.com/news/evtol-test-pilot-perspective/; Feb. 7, 2019.

"Flying the V-22" Vertical Mag. Mar. 2012. 2 pages.

Extended European Search Report issued by the European Patent Office for European application No. 25169297.6. dated Sep. 9, 2025 (11 pages).

* cited by examiner

FIG. 1A
PRIOR ART
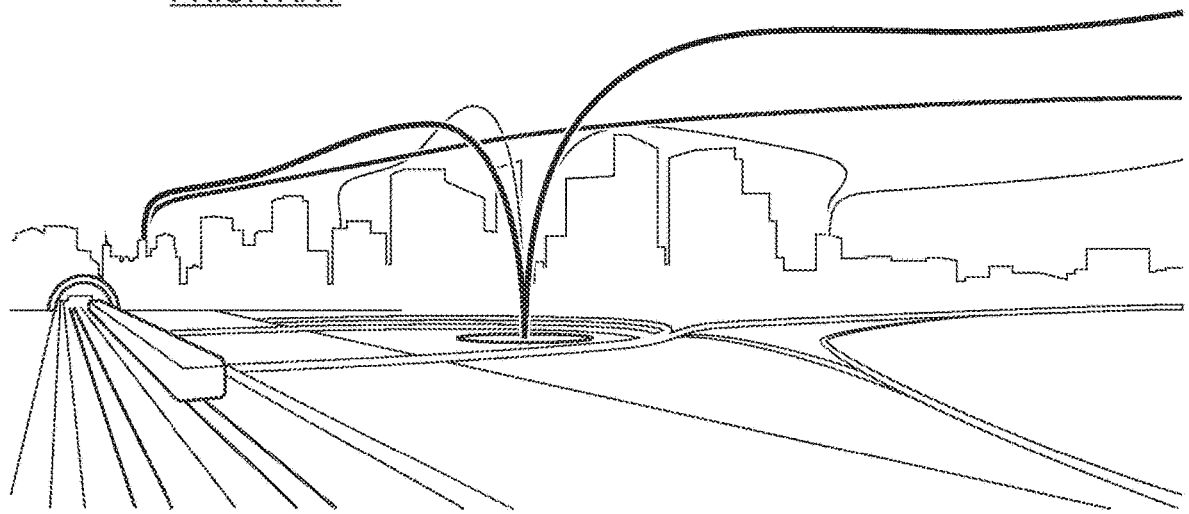
The upcoming multi-billion-dollar urban transportation market of safe, clean, and quiet hybrid-electric vertical takeoff and landing (eVTOL) aircraft that can fly piloted or autonomously.
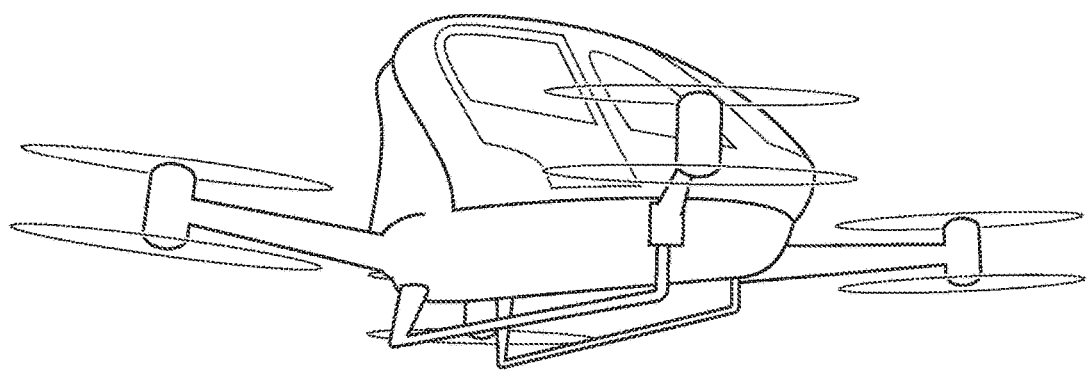
FIG. 3
PRIOR ART

| Dimension / Parameter | Value | Units | Dimension / Parameter | Front Rotor Value | Aft Rotor Value | Units |
|---|---|---|---|---|---|---|
| Basic Mission Takeoff Weight | 4767 | lb | Nacelle Length | 11.7 | 6.8 | ft |
| Nominal Payload Weight | 1100 | lb | Nacelle Max Cross-sectional Area | 3.83 | 0.95 | ft2 |
| Wing Area | 250 | ft2 | Nacelle Fineness Ratio (L/D) | 5.3 | 7.2 | |
| Span | 48 | ft | Propeller Diameter | 21 | 10 | ft |
| Average wing t/c | 0.17 | | Propeller Area/Propeller | 346 | 78.5 | ft2 |
| Taper ratio | 0.467 | | Propeller Solidity | 0.15 | 0.15 | |
| Average Chord | 5.21 | ft | Power/Propeller (Cruise at 150mph)* | 71.8 | 16.2 | hp |
| Wing Loading | 19.1 | lb/ft2 | Propeller RPM (Cruise at 150mph) | 141 | 296 | |
| Wing Control Surface Areas | 49.4 | ft2 | Propeller Tip Speed (Cruise at 150mph) | 269 | 269 | ft/sec |
| Horizontal Tail Area | 90 | ft2 | Propeller Advance Ratio | 4.46 | 4.46 | |
| Horizontal Tail Span | 22.5 | ft | Propeller Efficiency* | 72.5 | 72.5 | |
| Tail Control Surface Areas | 25.4 | ft2 | Power/Propeller (Hover)* | 192.9 | 43.8 | hp |
| Fuselage Volume | 222 | ft3 | Propeller RPM (Hover) | 366 | 770 | |
| Cabin Max Width | 5 | ft | Propeller Tip Speed (Hover) | 403 | 403 | ft/sec |
| Cabin Max Length | 13.3 | ft | Figure of Merit (Hover Prop Efficiency)* | 0.83 | 0.83 | |
| Cabin Max Cross-sectional Area | 22.9 | ft2 | Static Thrust/Propeller | 2292 | 520 | lbf |
| Total Fuselage Length | 32 | ft | Hover Disc Loading | 6.62 | 6.62 | lb/ft2 |
| Fuselage Fineness Ratio (L/D) | 6.4 | | Hover Power Loading* | 11.9 | 11.9 | lb/hp |
| Number of Passengers | 5 | | Total Hover Power Required* | 534.7 | | hp |

*Turbulent flow

Fig. 12

Dimensions in inches

Dimensions in inches

|  | Air Taxi | Family Use |
|---|---|---|
| Nose Row | 1 Pilot | 2 (1 Pilot + 1 Passenger) |
| Front Row | 2 Passengers | 3 Passengers |
| Aft Row | 2 Passengers | 3 Passengers |
| Limit Baggage in Compartment | 400 lbs | 400 lbs |
| Maximum Payload Weight | 1,100 lbs | 1,350 lbs |
| Maximum Takeoff Weight | 4,767 lbs | 5,017 lbs |

Fig. 13C

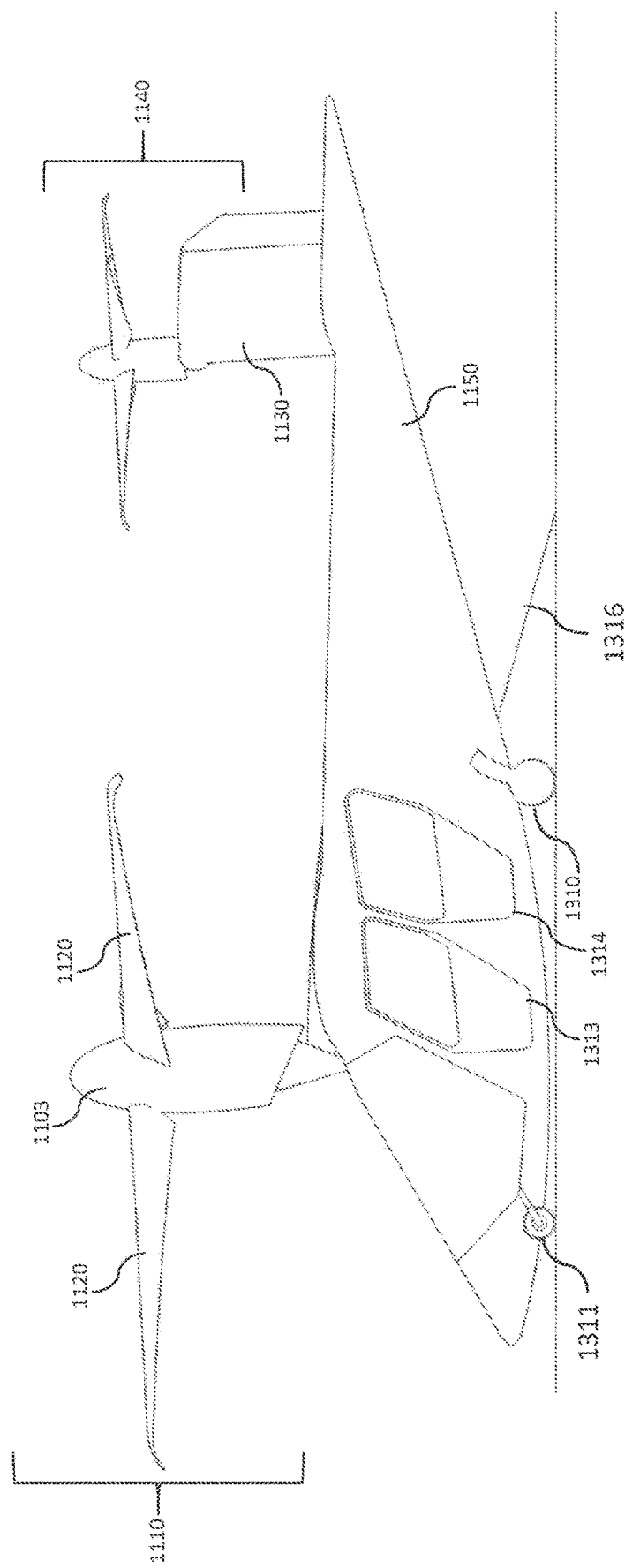

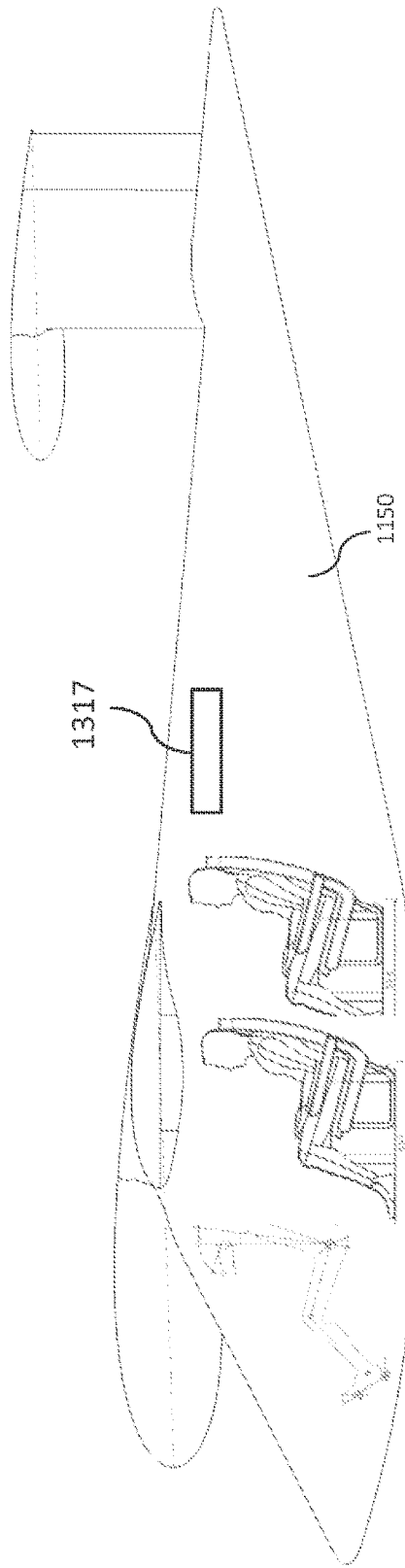

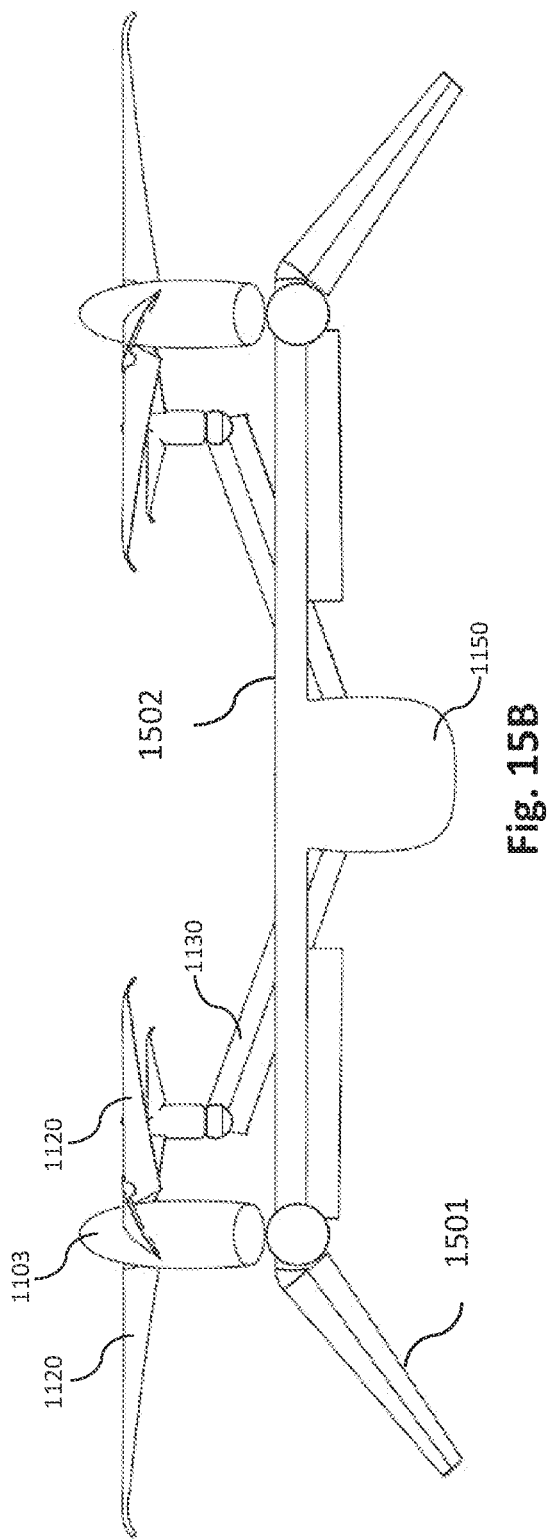

| RS r/R | Chord c/R | Twist deg | Thickness t/c | EIFLAP lb·ft2 | EILAG lb·ft2 | EA lb | GJ lb·ft2 | MASS lb/ft |
|---|---|---|---|---|---|---|---|---|
| 0.00000 | | | | | | | | |
| 0.07800 | | | | | | | | |
| 0.08000 | | | | | | | | | 10.09 |
| 0.10000 | | | | 2.78E+06 | 2.78E+06 | 1.18E+08 | 1.86E+06 | 10.09 |
| 0.12500 | 0.234 | 22.17 | 0.182 | 3.00E+06 | 3.14E+06 | 1.35E+08 | 8.22E+05 | 5.61 |
| 0.20000 | 0.225 | 19.13 | 0.177 | 3.31E+06 | 3.77E+06 | 8.73E+07 | 6.92E+05 | 5.12 |
| 0.30000 | 0.213 | 15.26 | 0.170 | 2.55E+06 | 4.54E+06 | 7.84E+07 | 5.66E+05 | 4.62 |
| 0.40000 | 0.200 | 11.56 | 0.160 | 1.65E+06 | 3.60E+06 | 5.83E+07 | 3.57E+05 | 3.67 |
| 0.50000 | 0.188 | 8.03 | 0.150 | 1.04E+06 | 2.83E+06 | 4.73E+07 | 2.50E+05 | 3.17 |
| 0.60000 | 0.175 | 4.68 | 0.143 | 6.26E+05 | 2.20E+06 | 3.70E+07 | 1.70E+05 | 2.70 |
| 0.70000 | 0.163 | 1.50 | 0.135 | 3.70E+05 | 1.74E+06 | 2.79E+07 | 1.18E+05 | 2.34 |
| 0.80000 | 0.150 | -1.50 | 0.128 | 1.99E+05 | 1.38E+06 | 2.01E+07 | 8.30E+04 | 2.00 |
| 0.90000 | 0.138 | -5.92 | 0.120 | 1.01E+05 | 9.91E+05 | 1.36E+07 | 4.78E+04 | 1.68 |
| 1.00000 | 0.125 | -3.16 | 0.090 | 4.94E+04 | 7.88E+05 | 9.70E+06 | 3.28E+04 | 1.42 |
| | | | | 1.72E+04 | 6.01E+05 | 7.38E+06 | 1.07E+04 | 1.25 |

Fig. 16A

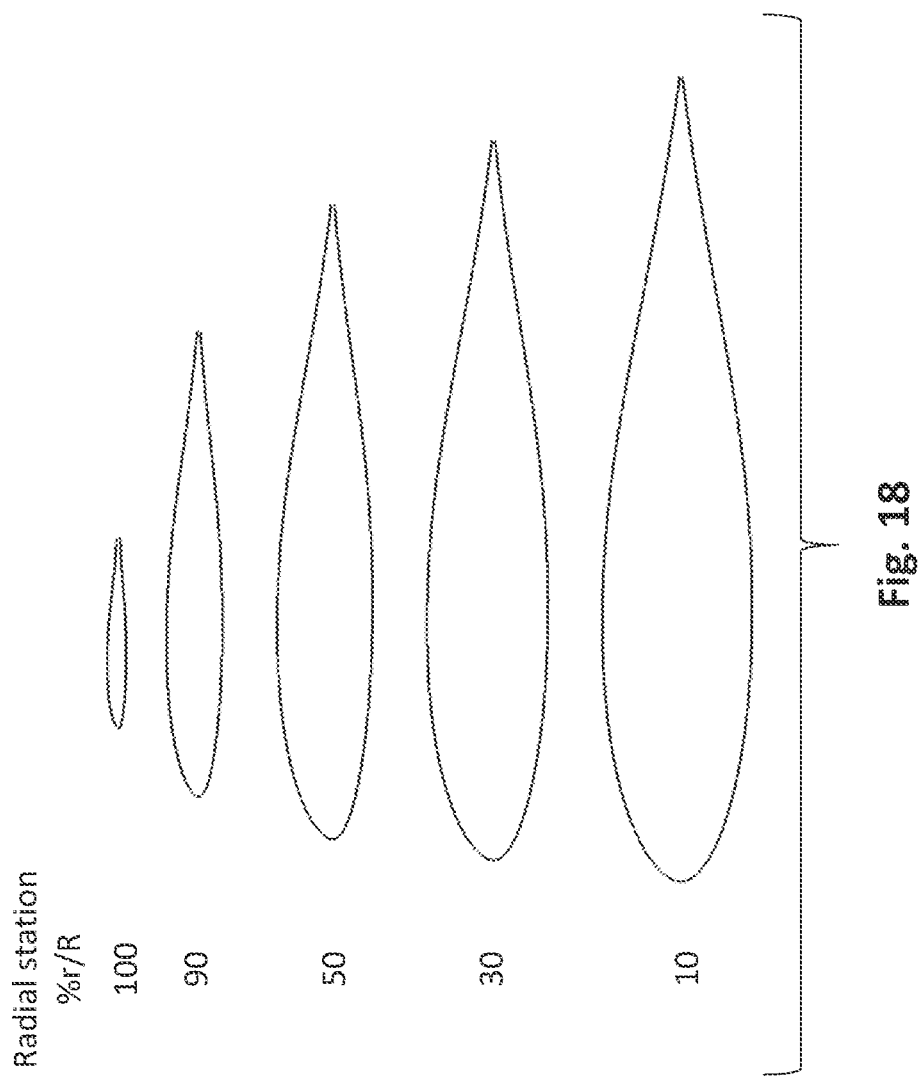

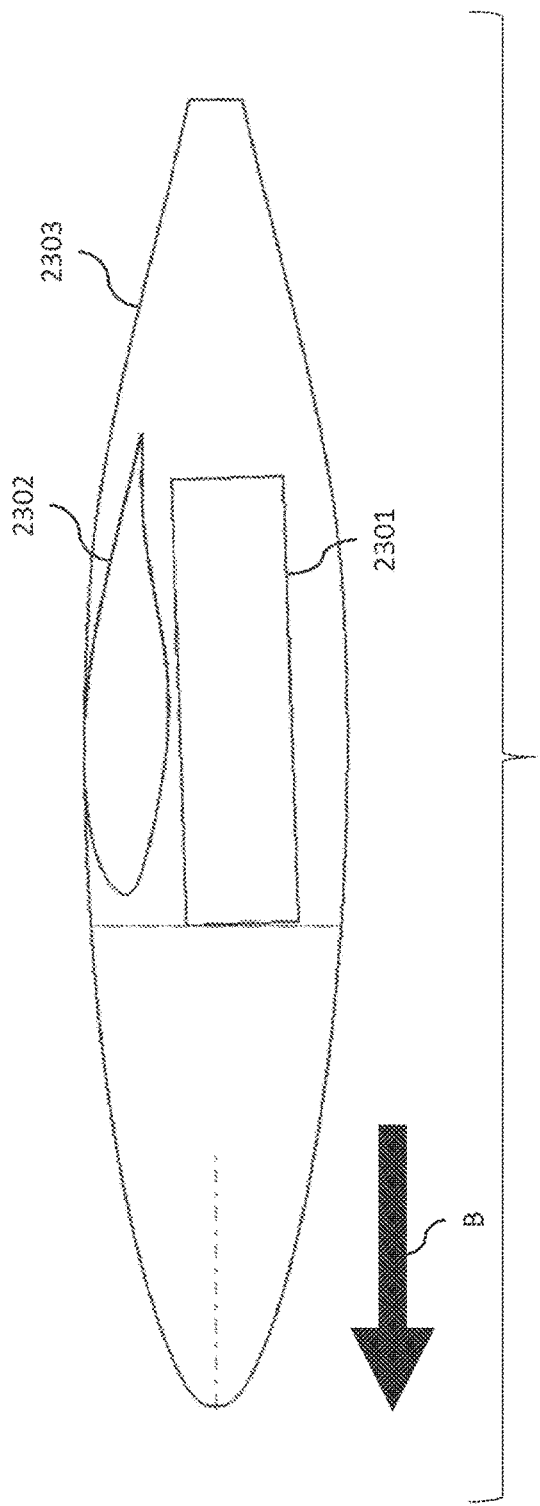
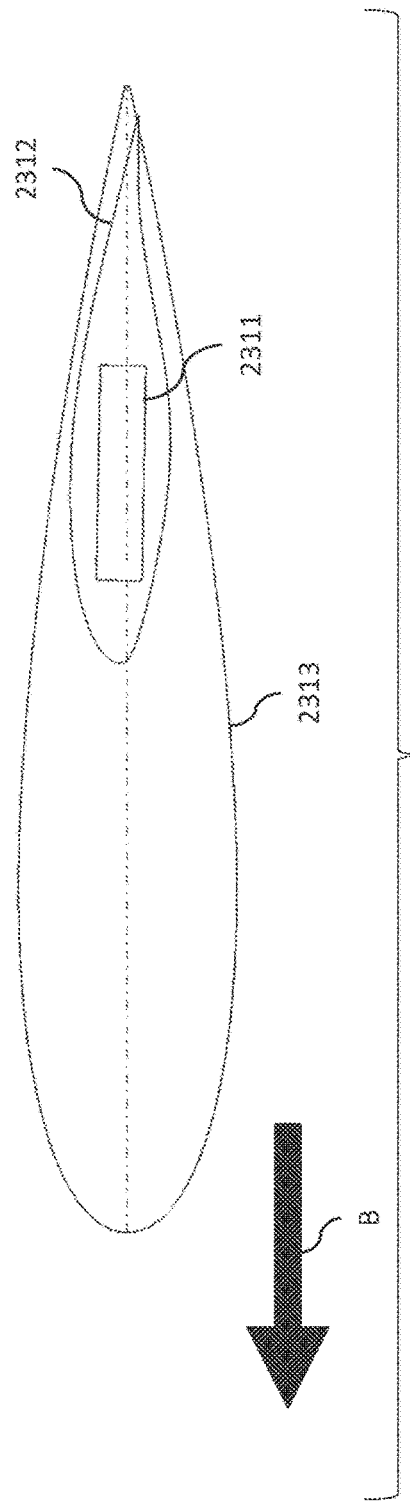
Fig. 23A
Fig. 23B

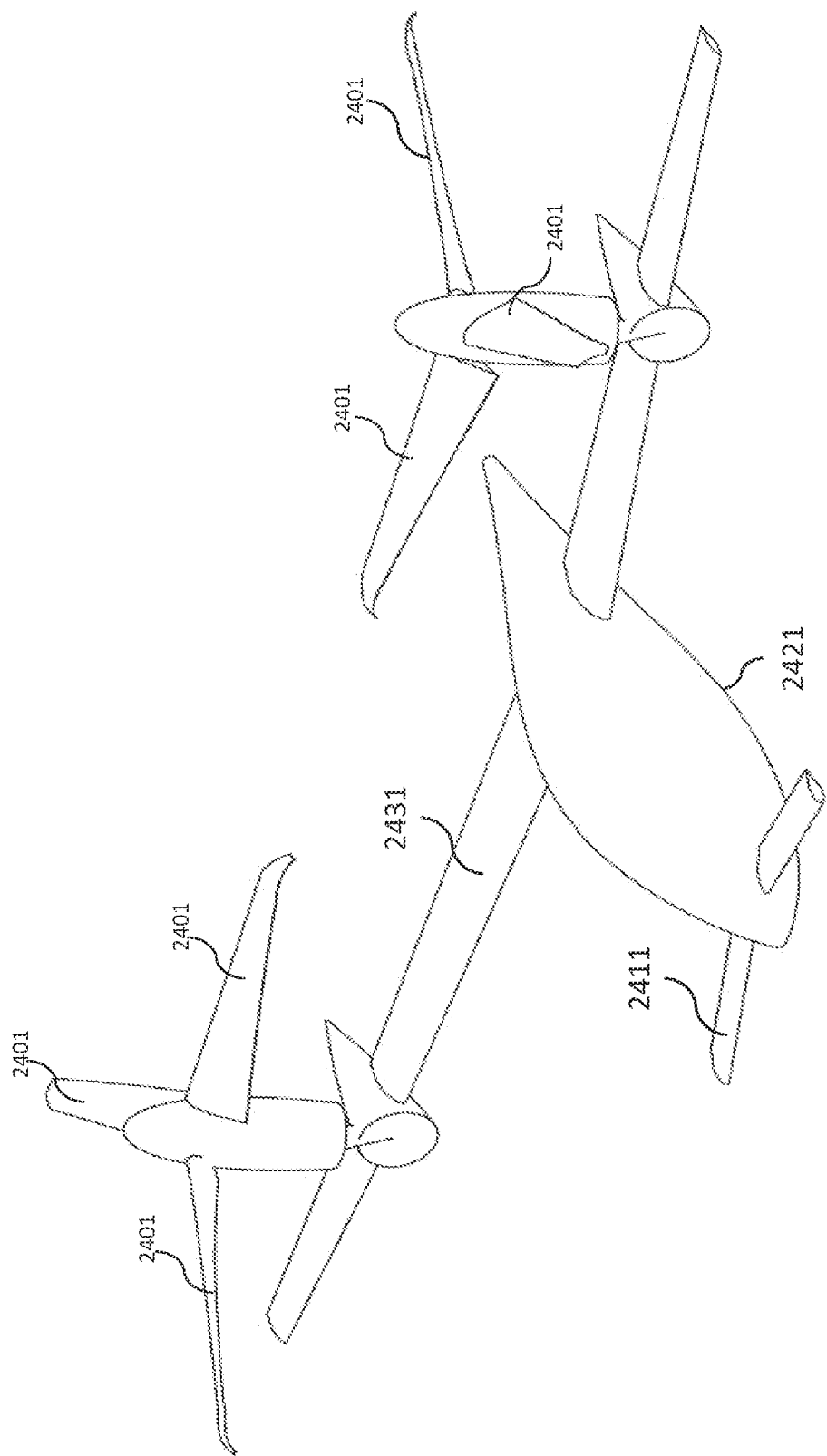

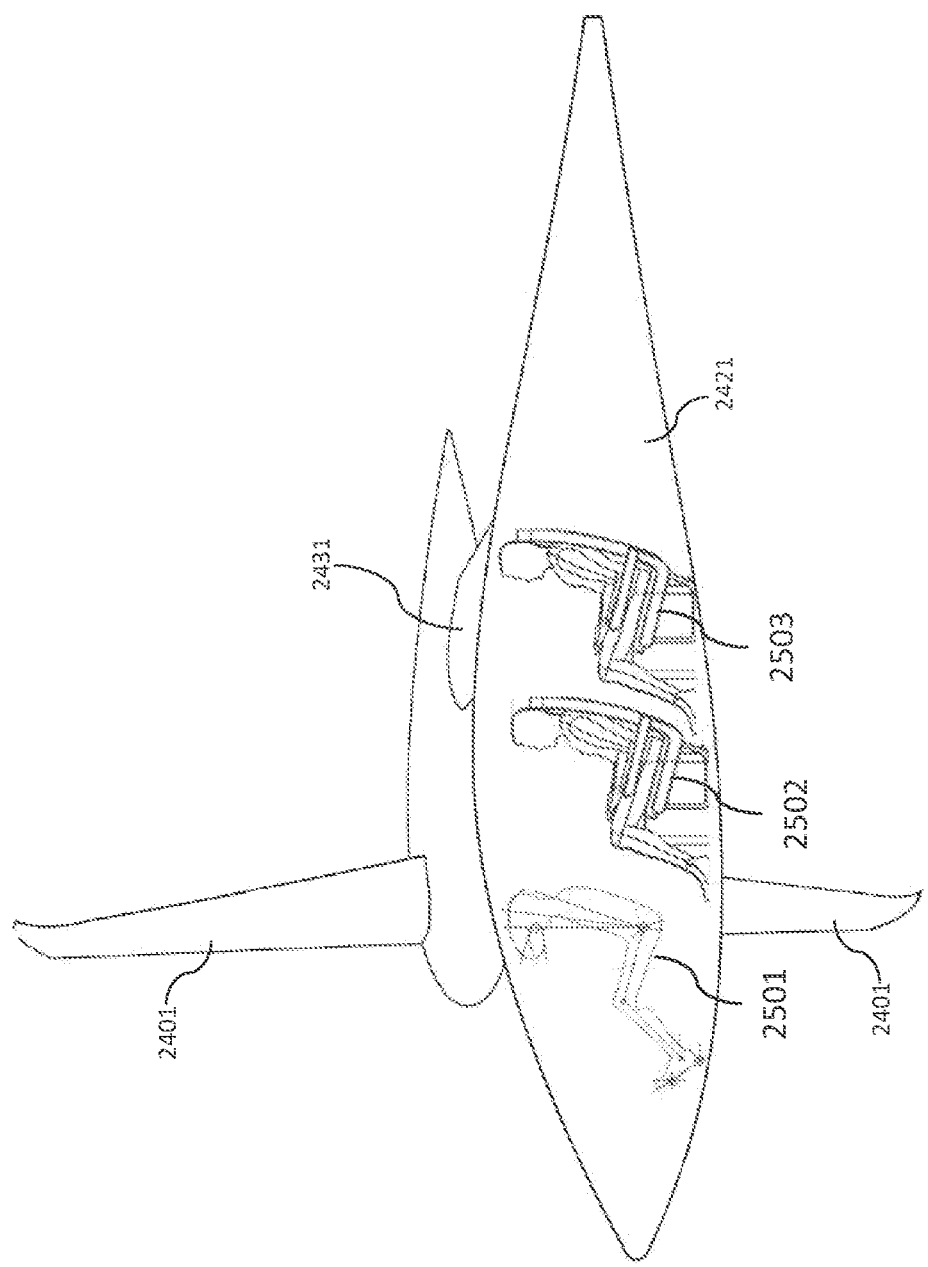

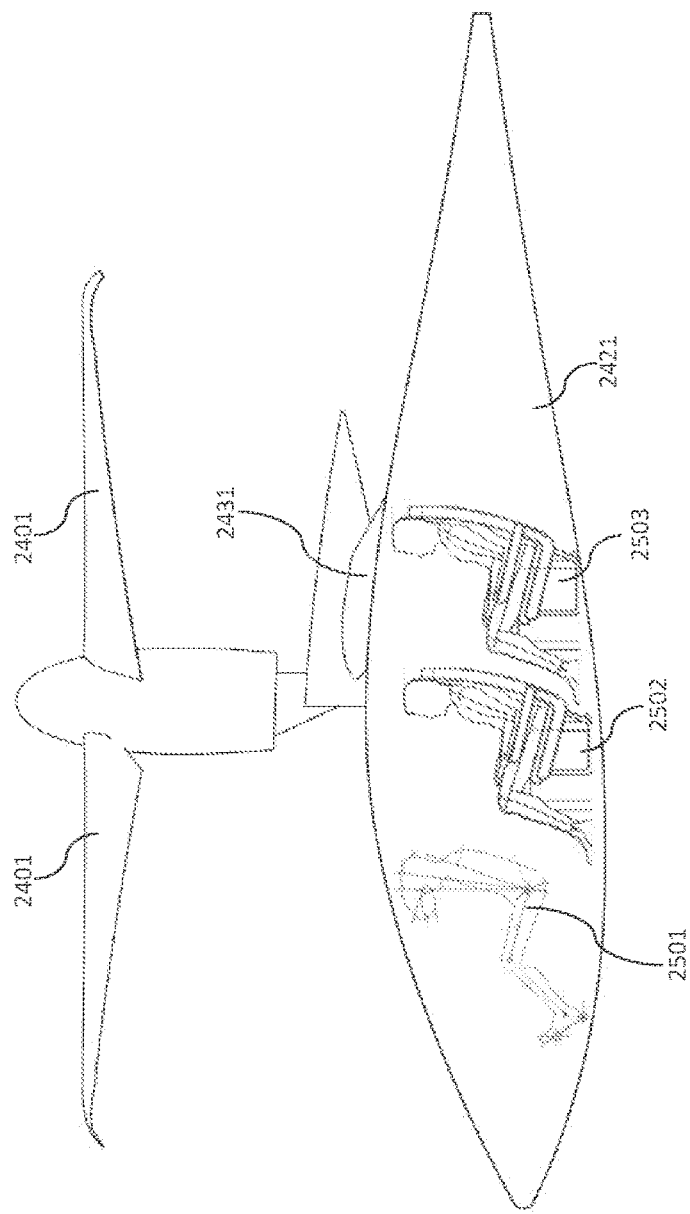

| Dimension / Parameter | Value | Units | Dimension / Parameter | Value | Units |
|---|---|---|---|---|---|
| Basic Mission Takeoff Weight | 3950 | lb | Nacelle Length | 11.7 | ft |
| Nominal Payload Weight | 1100 | lb | Nacelle Max Cross-sectional Area | 3.83 | ft2 |
| Wing Area | 140 | ft2 | Nacelle Fineness Ratio (L/D) | 5.3 | |
| Span | 48 | ft | Propeller Diameter | 21 | ft |
| Average wing t/c | 0.17 | | Propeller Area/Propeller | 346 | ft2 |
| Taper ratio | 0.429 | | Propeller Solidity | 0.15 | |
| Average Chord | 2.92 | ft | Power/Propeller (Cruise) | 52.7 | hp |
| Wing Loading | 28.2 | lb/ft2 | Propeller RPM (Cruise) | 135 | |
| Wing Control Surface Areas | 28.0 | ft2 | Propeller Tip Speed (Cruise) | 258 | ft/sec |
| Canard Surface Area | 30 | ft2 | Propeller Advance Ratio | 4.66 | |
| Canard Span | 13 | ft | Propeller Efficiency | 71.5 | |
| Canard Control Surface Area | 30 | ft2 | Power/Propeller (Hover) | 191.6 | hp |
| Fuselage Volume | 169 | ft3 | Propeller RPM (Hover) | 366 | |
| Cabin Max Width | 5 | ft | Propeller Tip Speed (Hover) | 350 | ft/sec |
| Cabin Max Length | 12.7 | ft | Figure of Merit (Hover Prop Efficiency) | 0.83 | |
| Cabin Max Cross-sectional Area | 19.4 | ft2 | Static Thurst/Propeller | 2330 | lbf |
| Total Fuselage Length | 25.5 | ft | Hover Disc loading | 6.73 | lb/ft2 |
| Fuselage Fineness Ratio (L/D) | 5.03 | | Hover Power loading | 12.2 | lb/hp |
| Number of Passengers | 5 | | Total Hover Power Required | 430.8 | hp |

Fig. 26

BATTERY AND ENGINE ARCHITECTURE FOR VTOL AIRCRAFT

CROSS-REFERENCE TO RELATED APPLICATIONS

This disclosure is a continuation of U.S. application Ser. No. 17/513,804, filed Oct. 28, 2021, which is a continuation of U.S. application Ser. No. 16/872,017, filed May 11, 2020, now U.S. Pat. No. 11,964,755, issued Apr. 3, 2024, which is a divisional of U.S. application Ser. No. 16/155,669 filed Oct. 9, 2018, now U.S. Pat. No. 11,066,159, issued Jun. 30, 2021, which is a divisional of U.S. application Ser. No. 15/985,507, filed May 21, 2018, now U.S. Pat. No. 10,351,235, issued Jun. 26, 2019, which claims priority to U.S. provisional Application Ser. No. 62/509,666, filed May 22, 2017, U.S. provisional Application Ser. No. 62/509,674, filed May 22, 2017, and U.S. provisional Application Ser. No. 62/656,971, filed Apr. 12, 2018 The contents of each application is incorporated by reference in its entirety for all purposes.

FIELD OF THE INVENTION

The field of the invention is vertical take-off and landing aircraft.

BACKGROUND

The background description includes information that may be useful in understanding the present invention. It is not an admission that any of the information provided herein is prior art or relevant to the presently claimed invention, or that any publication specifically or implicitly referenced is prior art.

There is a considerable demand for electric powered transportation. Due to the current limitations of rechargeable batteries (energy density—220 Wh/Kg-300 Wh/Kg, depth of discharge, charge/discharge rates, and cycle-life issues), the general sequence of battery-powered vehicles' market entry (discounting slow short-range vehicles such as golf carts) is as follows:

Automobiles—these are the easiest vehicles to adopt electric power. Automobiles can accept heavy batteries, there is a relatively low battery drain rate, and operation can be safely stopped with depletion of the battery.

Powered sailplanes—Here a powerplant is used for launching an otherwise safe glider.

Fixed-wing training aircraft—useful for flights of short duration, operated from established airports with professional instructors, maintenance, and management.

Privately owned fixed—wing-next easiest due rolling take-off and landing with a high wingborne lift to drag ratio.

Electric VTOL (eVTOL)—more challenging due the high power required for hover, especially if high-speed efficient cruise is also required eVTOL has become even more challenging as the market shift from "specialized transport" aircraft making shorter trips (25-60 miles) between well-equipped terminals, to "urban mobility" aircraft making longer trips with at least one poorly equipped landing spot. The need is exemplified by information published by Uber™, and reproduced herein as prior art FIGS. 1A and 1B. FIG. 1A is a conceptual image of an upcoming urban transportation market for Uber®'s proposed hybrid-electric vertical takeoff and landing (eV-TOL) aircraft. FIG. 1B is a projected schedule of development and operations for such aircraft.

Safety and efficiency are perhaps the two most critical factors for developing eVTOL aircraft to satisfy this market. To achieve high safety, much of the prior art is focusing on aircraft that use six, eight, or even more, independently operated rotors. If any single rotor fails in such aircraft, the other rotors are likely to be capable of making a safe landing. Even quad rotor aircraft are not considered to be particularly fault-tolerant, because failure of a single rotor can crash the aircraft.

Several proposed and prototype aircraft are being designed using this many-rotor strategy. For example, FIGS. 2A and 2B are artist's renditions of a prior art 16-rotor Volocopter™, FIG. 3 is a photograph of a prior art 8-rotor Ehang™, and FIG. 4 is a photograph of a prior art 8-rotor CityAirbus™. All these designs are, however, problematic because the rotors do not tilt from vertical lift to forward propulsion positions, and there are no wings. That combination is extremely inefficient in forward flight, which limits the aircraft to relatively short ranges.

Some eVTOL aircraft are being developed that continue to use the many-rotor strategy, but add a wing to improve forward flight efficiency. For example, FIG. 5 is an artist's rendition of a prior art 36-rotor Lilium™ eVTOL, in which the rotors tilt about the forward and aft wings. The manufacturer claims a 300 km range, and 300 km/hr speed. This aircraft is, however, still problematic because the high disc loading results in low power loading (high installed power per weight), which reduces efficiency and range, and produces high noise levels.

Instead of having the rotors tilt about the wings, it is possible to have the rotors disposed in fixed position with respect to the wings, and tilt the wings. An example of that strategy is shown in FIG. 6, which is an artist's rendition of an 8-rotor Airbus™ A3 Vahana. This aircraft is problematic because it trades off higher efficiency in forward flight for very high power requirements during transition from vertical lift to forward flight. In such transition, the wings act as huge airbrakes.

It is also possible to have the rotors tilt about one or more fixed wings. Although a photograph is not available, FIG. 7 is an image of a Computational Fluid Dynamics (CFD) flow solution for the Joby™ 6-rotor eVTOL concept. This aircraft resolves some of the problems cited above, but the use of many-rotor strategy means the rotors are relatively small. This necessarily means high disc loading, which results in low power loading (high installed power per weight) and high noise level.

The only other solution that the prior art seems to have contemplated is to separate the vertical lift rotors from the forward propulsion rotors/propellers. The idea is that use of different lift and cruise propulsion systems allows each system to be is optimized for its particular function. FIG. 8 is an artist's rendition of the Aurora™ eVTOL concept, which uses eight lifting rotors and an aft facing propeller. This design is problematic because the duplicate propulsion systems require heavier and more expensive hardware, have marginal climb rate in wing borne cruise due to sizing the cruise powerplant for level cruise, and potentially have a smaller wingborne stall speed margin-gust entry and recovery, due to design optimization for higher cruise lift coefficient (smaller wing). Example: if flying at 130 mph, a vertical gust of 20 Ft/sec will increase the angle of attack by 6 degrees, may stall a small wing at its efficient lift coefficient of 0.9, but not stall a bigger wing at CL=0.5.

FIGS. 9A and 9B show artists' conceptions of a similar design, the Terrafugia™ eVTOL. This design has the drawbacks mentioned above with respect to duplicate propulsion systems, and in addition, the twin tilt rotor configuration does not provide a method for pitch control in rotor borne flight.

Motor installations in the prior art are also directed towards small rotors having small torque requirements. For example, FIG. 10 shows the motor installation of the Airbus™ A3 Vahana™. The motor is arranged in a direct-drive configuration where motor and propeller spin at the same rotational speed. This simple propulsion system solution is problematic for large rotors with large torque requirements.

Because of the physics involved, it is relatively straightforward to design a many-rotor eVTOL that carry a small payload (less than 500 pounds) over short distances. For larger payload weights and commercially desirable ranges the strategy of using many rotors becomes increasingly problematic. Using a larger number of smaller rotors provides less disc area than fewer big rotors, requires more power per aircraft weight, is difficult to hover at low noise because the lower total rotor disc area results in higher blade tip Mach numbers, or in larger number of wide-chord blades, or both, and makes autorotation flight after loss of power more dangerous, because the autorotation descent rate increases in proportion to the square root of rotor disc loading and recovery from high descent rate is risky.

Using a small number of bigger rotors (two, three or four) could solve some of the problems discussed above, but that approach is completely contrary to the prevailing wisdom. Among other things, the characteristics needed to optimize vertical lift are very different from the characteristics needed to optimize forward flight. In addition, those of ordinary skill in the art would dismiss the idea of having fewer rotors on the grounds that doing so would unacceptably sacrifice safety in the event of motor failure of any of the rotors, and would introduce unacceptable inefficiencies for an eVTOL. Still further, these problems cannot adequately be resolved by having separate lift and forward propulsion systems.

What is still needed is a vertical takeoff and landing rotorcraft that can safely carry a payload of at least 500 pounds, using a unitary lift and forward propulsion system with no more than four rotors, all while powered by the current technology battery.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

SUMMARY OF THE INVENTIVE SUBJECT MATTER

The inventive subject matter provides apparatus, systems and methods in which an electric vertical takeoff and landing (eVTOL) aircraft is engineered to carry at least 500 pounds (approx. 227 kg) using a reduced number (e.g., 2-4) of variable speed rigid (non-articulated) rotors.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1A is a prior art conceptual image of an upcoming urban transportation market for Uber®'s proposed hybrid-electric vertical takeoff and landing (eVTOL) aircraft.

FIG. 3 is an artist's rendition of a prior art 8-rotor Ehang™.

FIG. 12 is a table of dimensions and parameters of the aircraft of FIG. 11.

FIG. 13C is a table describing possible seating arrangements and calculated weights of the aircraft of FIG. 11.

FIG. 13F is a schematic side view of an open aft ramp of the aircraft of FIG. 11.

FIG. 13G is a schematic view of a side section of the aircraft of FIG. 11.

FIG. 15B is a schematic front view of the outboard wing of FIG. 15A, in a folded orientation in the aircraft of FIG. 11.

FIG. 16A is a table describing calculated rotor geometry and properties as functions of non-dimensional radial station of the aircraft of FIG. 11.

FIG. 18 are schematics of five cross-sectional airfoil profiles of the rotor blades at specified radial stations, of the aircraft of FIG. 11.

FIG. 23A is a schematic cross sectional view of a nacelle that can be used with the aircraft of FIG. 11, in which a battery is disposed below the wing, and internal to the nacelle.

FIG. 23B is a schematic cross sectional view of a nacelle and wing that can be used with the aircraft of FIG. 11, in which a battery is disposed within the wing.

FIGS. 24A-24G are schematic perspective views of an alternative preferred VTOL aircraft according to the inventive concepts herein. This version has no secondary rotors.

FIGS. 25A and 25B are schematic vertical cross-sectional views of the alternative VTOL aircraft of FIGS. 24A-24G, depicting a 3-row seating comparable to that of the 4-rotor configuration of FIG. 13G FIG. 26 is a table of dimensions and parameters of the 2-rotor alternative VTOL aircraft of FIGS. 24A-24G.

DETAILED DESCRIPTION

Figure 1B:
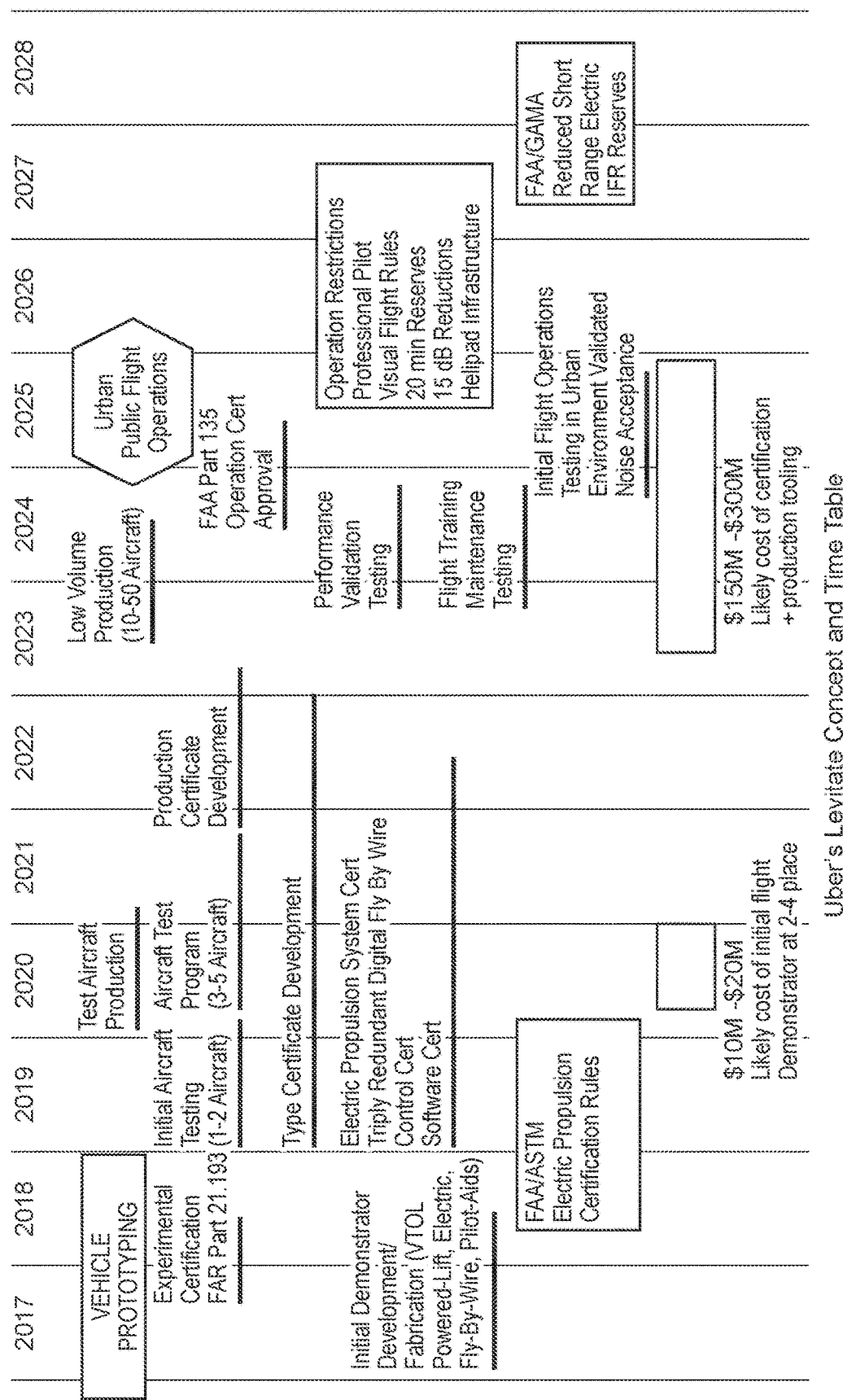
FIG. 1B is a prior art projected schedule of development and operations for an aircraft according to FIG. 1A.
Figure 2A:
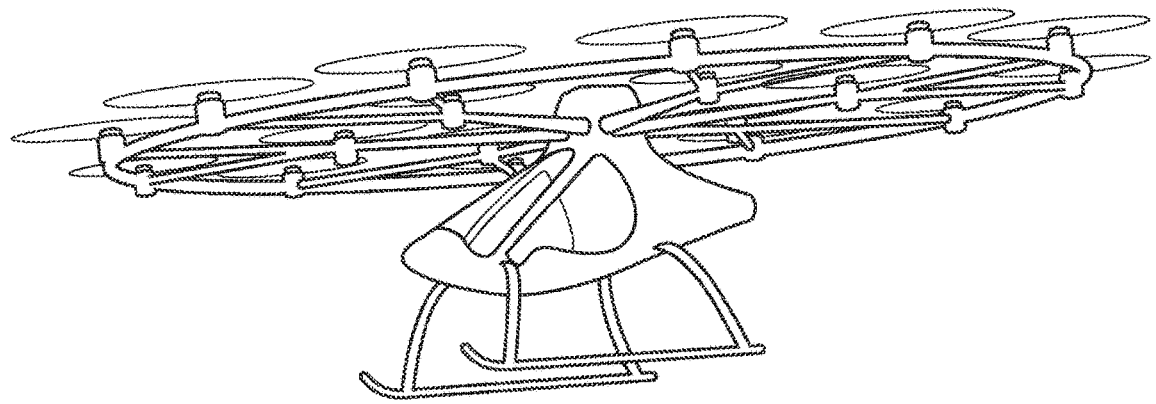
FIGS. 2A and 2B are artist's renditions of a prior art 16-rotor Volocopter™.
Figure 2B:
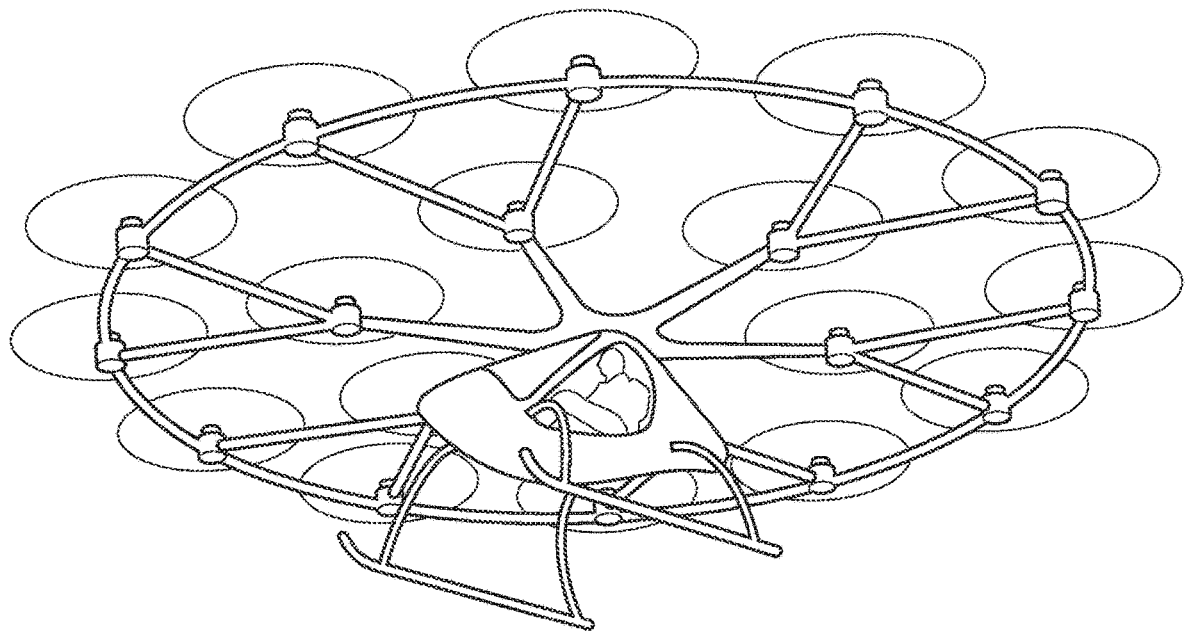
Figure 4:
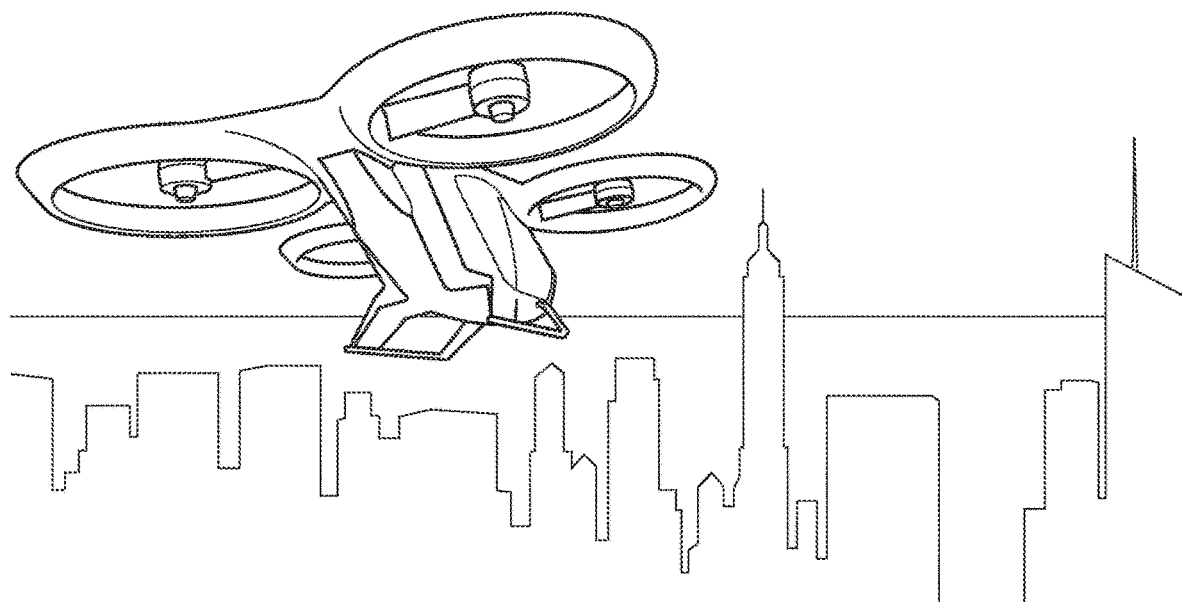
FIG. 4 is an artist's rendition of a prior art 8-rotor CityAirbus™.
Figure 5:
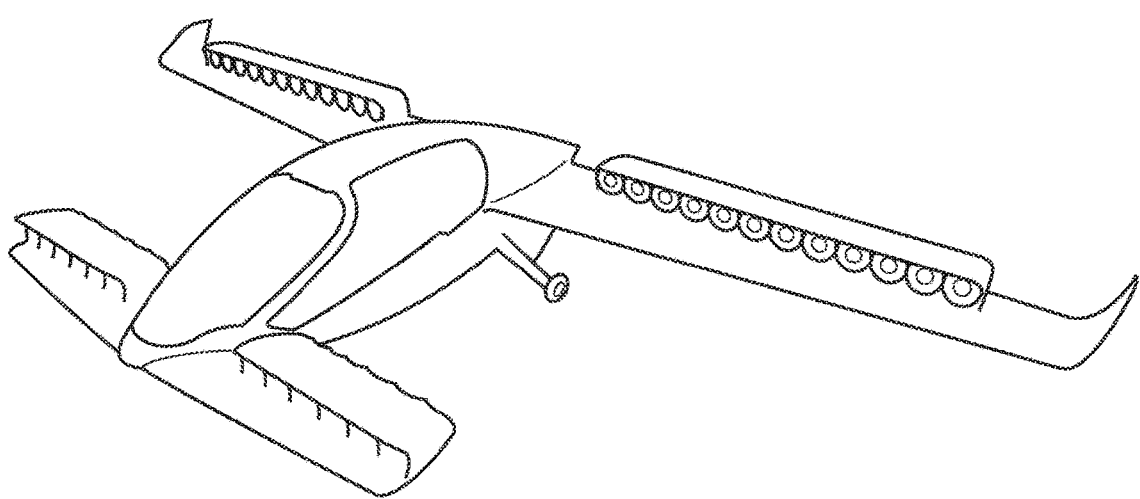
FIG. 5 is an artist's rendition of a prior art 36-rotor Lilium™ eVTOL, in which the rotors tilt about the forward and aft wings.
Figure 6:
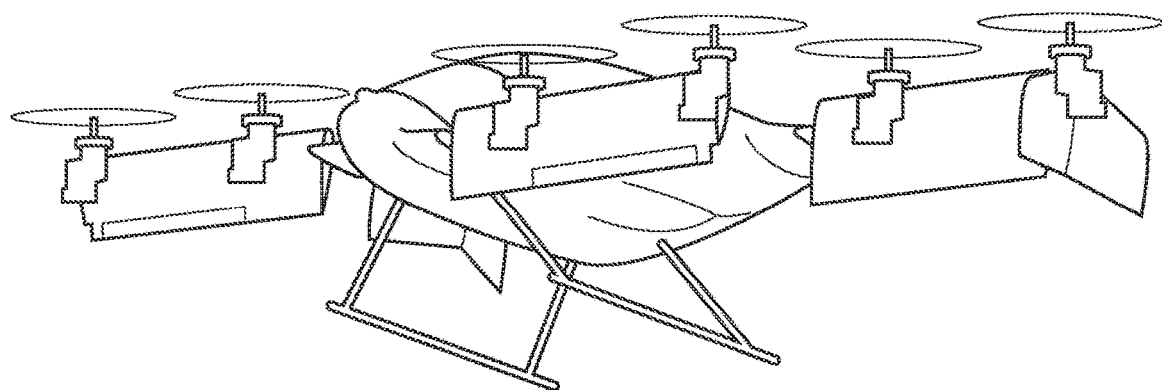
FIG. 6, which is an artist's rendition of a prior art, 8-rotor Airbus™ A3 Vahana™.
Figure 8:
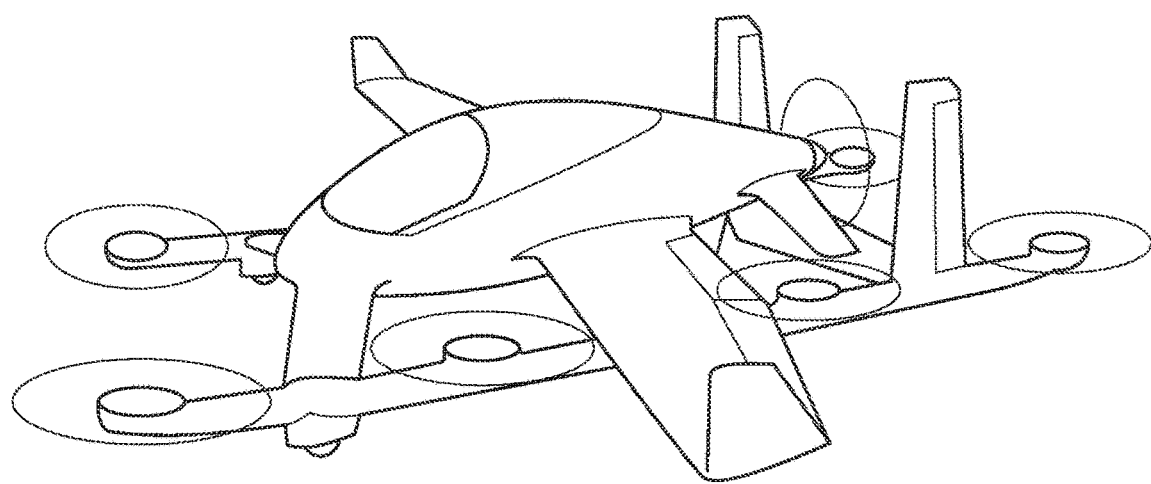
FIG. 8 is a prior art artist's rendition of the Aurora™ eVTOL concept aircraft, which uses eight lifting rotors and an aft facing propeller.
Figure 7:
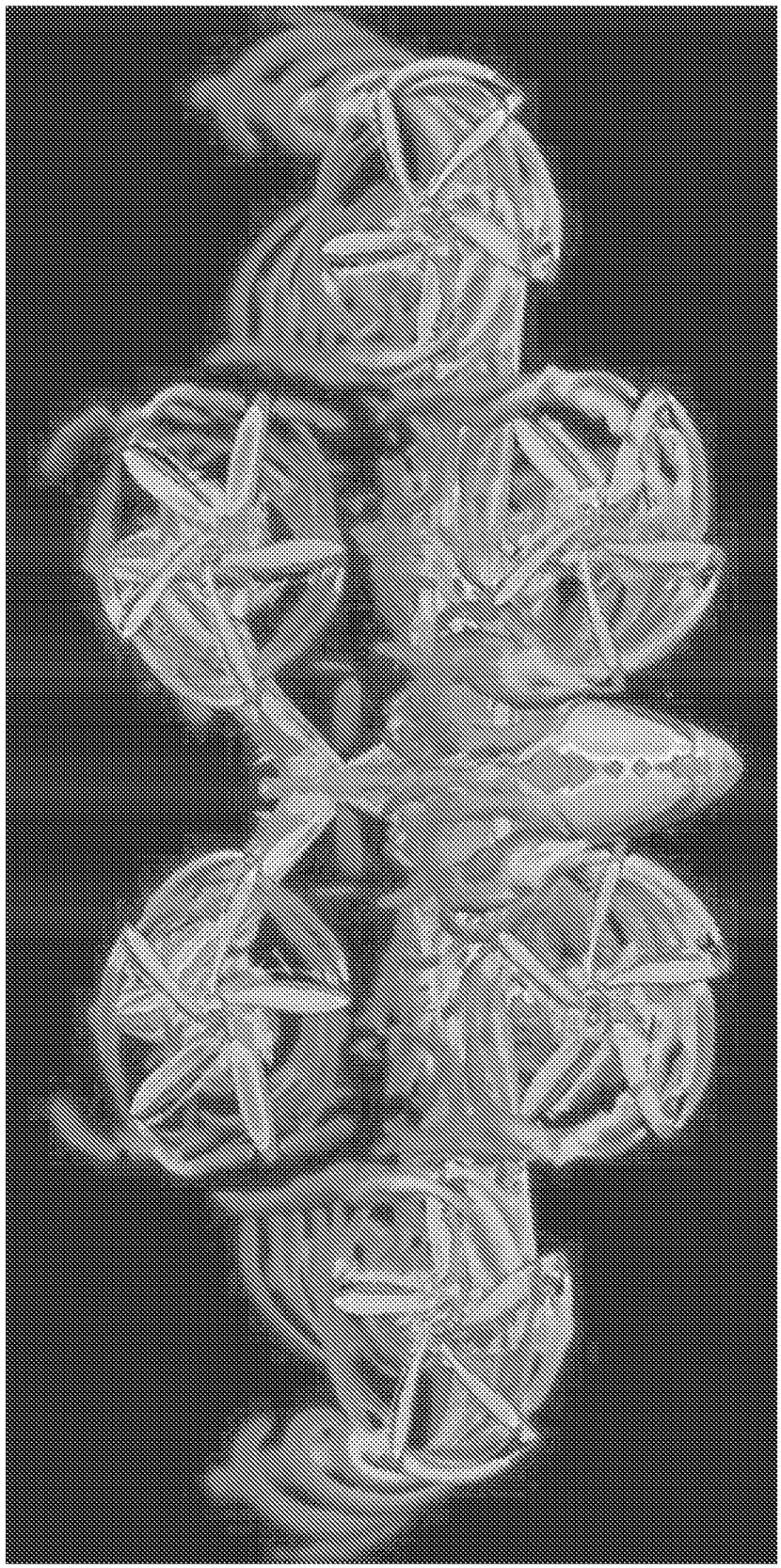
FIG. 7 is an image of a Computational Fluid Dynamics (CFD) flow solution for the prior art Joby™ 6-rotor eVTOL concept aircraft.
Figure 9A:
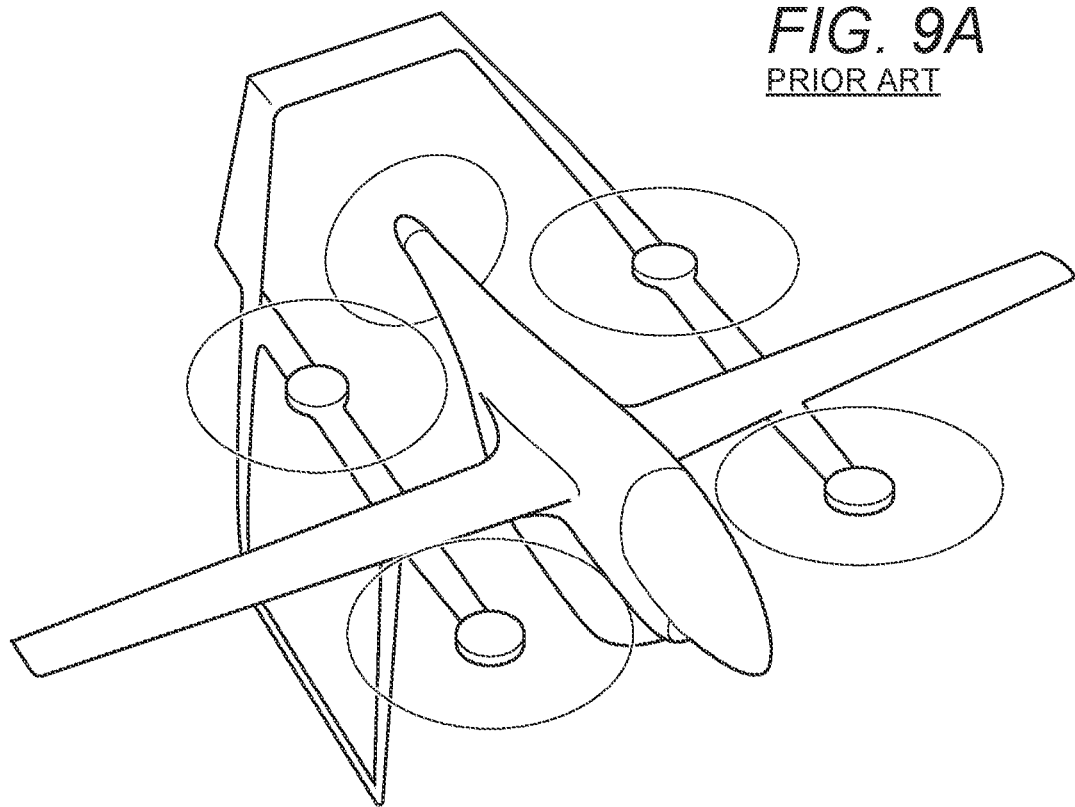
FIGS. 9A and 9B show prior art artists' conceptions of a Terrafugia™ eVTOL aircraft.
Figure 9B:
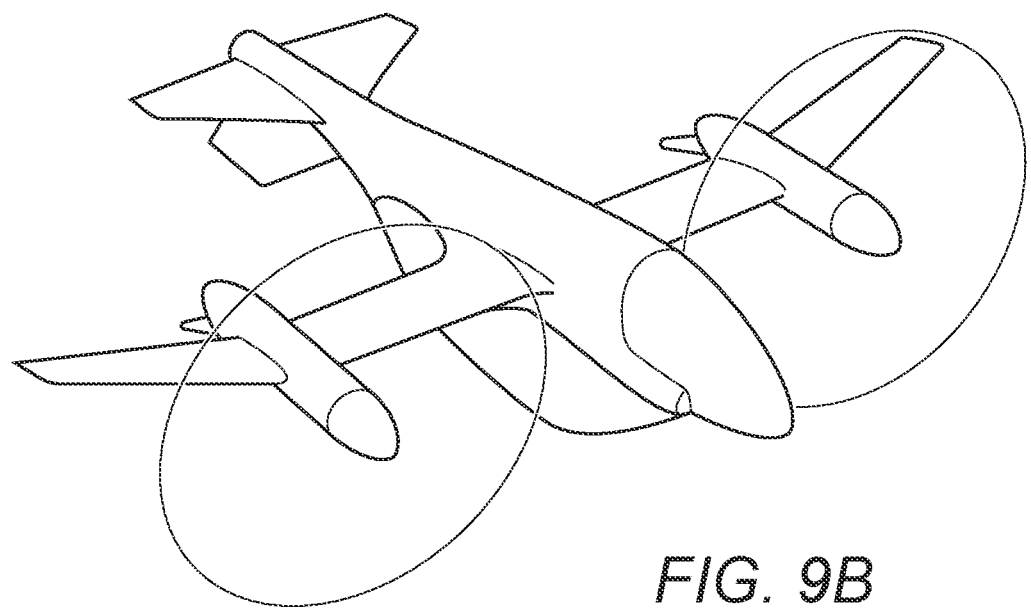
Figure 10:
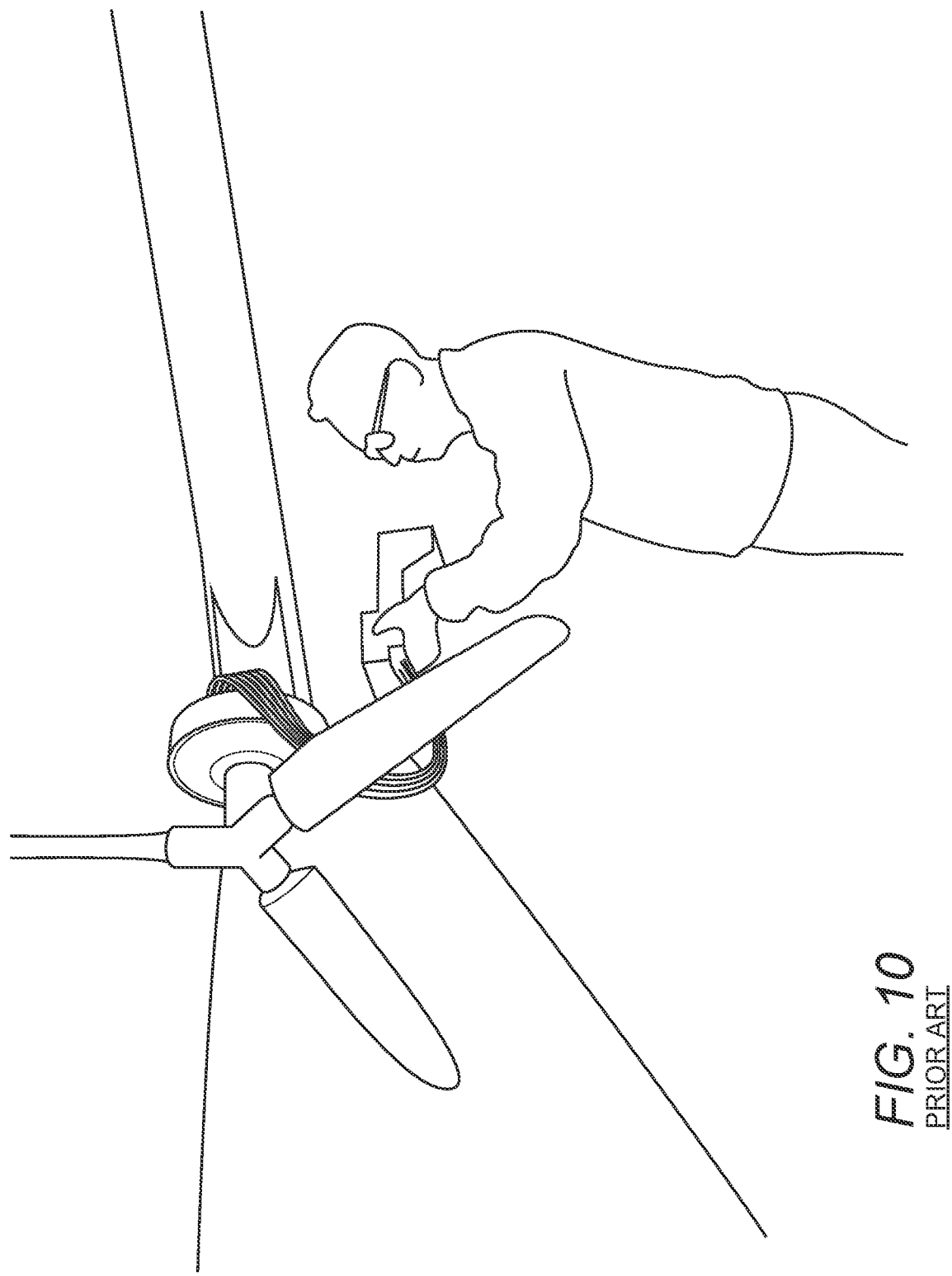
FIG. 10 shows the motor installation of the prior art Airbus™ A3 Vahana™.

The inventive subject matter provides apparatus, systems and methods in which an electric powered vertical takeoff and landing (eVTOL) aircraft is engineered to carry at least 500 pounds (approx. 227 kg) using a reduced number (2-4) of variable speed rigid (non-articulated) rotors, generally assembled as primary and secondary rotors. The rotors, whether primary or secondary, are preferably tilt rotors such that one or more of the rotors provides a significant amount of lift (e.g., 70%, etc) during rotor borne flight (e.g., vertical takeoff, etc), and can be tilted to provide forward thrust (or air braking) during wingborne flight.

In some contemplated embodiments, each rotor can be powered by its own electric motor or motors, and in other contemplated embodiments, multiple rotors can be powered by a single electric motor. In especially preferred embodiments, individual rotors can be powered by three electric motors. It is also contemplated that different electric motors could be powered by different battery packs, or multiple electric motors could be powered by a single battery pack.

The terms "battery" and "battery pack" are used interchangeably herein to refer to one or multiple chemical cells that produce electricity. Batteries preferably utilize Li-ion chemistries, and have a specific energy density of about 100 kWh/lb. Other contemplated battery chemistries include Li-Polymer and Li-Metal.

Non-articulated rotors are preferred because alteration of individual blade angles can be used to apply force moments to control pitch of the aircraft in both VTOL and wingborne cruise flight. Blade angle control is preferably achieved by individual blade control actuators preferably fit inside their respective blades, fitted axially to the pitch axis. The individual blade control system utilized on at least each of the first and second primary rotors imparts a differential collective pitch between blades on the rotor, such that rotor thrust is maintained approximately constant, while shaft torque is increased above the torque required without differential collective. Details can be found in provisional applications, 62/513,930 (Tigner) "A Propeller Or Rotor In Axial Flight For The Purpose Of Aerodynamic Braking", and 62/513,925 (Tigner) "Use Of Individual Blade Control To Enhance Rotorcraft Power Response Quickness", each of which is incorporated by in its entirety reference herein.

In preferred embodiments, the aircraft has primary and secondary rotors. The primary rotors comprise blades and hubs configured to provide for force moments at least equal to the rotor maximum lift times 6% of rotor radius, more preferably at least 9% of rotor radius, and most preferably at least 12% of rotor radius To achieve commercially viable flight duration, lift and other characteristics with no more than four rotors, and presently available battery technologies, at least the primary rotors needs to be relatively large. Accordingly, each of the primary rotors is configured to provide a disc loading lower than 10 psf, and hover power loading higher than 8 lb/HP. More preferably, each of the primary rotors is configured to provide a disc loading lower than 6 psf, and hover power loading higher than 10 lb/HP. Other contemplated aircraft embodiments have less than 8 lb/HP power loading.

Furthermore, to achieve high rotor efficiency in rotor borne and in wingborne flight, a sustained rotor operation over a wide range of rotor RPM (such as 20% to 100%) is necessary, contemplated embodiments utilize rotor designs disclosed in U.S. Pat. No. 6,007,298 (Karem) "Optimum Speed Rotor" (OSR) and U.S. Pat. No. 6,641,365 (Karem) "Optimum Speed Tilt Rotor" (OSTR).

Using the OSR and OSTR teachings, aircraft contemplated herein preferably achieve flap stiffness of each blade that is not less than the product of 100, or even more preferably 200, times the rotor diameter in feet to the fourth power, as measured in lbs-in2, at 30% of the rotor radius as measured from a center of rotor rotation.

Also, using the OSR and OSTR teachings, each blade weight in lbs preferably does not exceed the product of 0.004 times the diameter of the rotor in feet cubed.

Embodiments having first and second primary rotors are contemplated to include at least one optional first auxiliary rotor, each of which has no greater than 50% of the disc area of each of the primary rotors. In more preferred embodiments, each of the auxiliary rotors has no greater than 40% of the disc area of each of the primary rotors. Auxiliary rotors need not be the same size as each other.

The auxiliary rotor or rotors is/are also preferably rigid (no-articulated) rotors, which are configured to produce pitch force moments by altering the pitch of individual blades. At least the first auxiliary rotor is advantageously configured to provide a maximum aircraft pitch force moment that is no greater than the collective total aircraft pitch force moment capability of the primary rotors.

For each rotor, the rotating hub, the corresponding hub bearing, gearbox, and motor mounting fixture are all configured together as an integrated rotor drive system. The preferred embodiment includes three independently controlled motors connected to a single gearbox per primary rotor. The three independently controlled motors provide a safety benefit through redundancy, and additionally that configuration has been found to be a lightweight solution for the high torque output required by a variable speed rotor.

Preferred embodiments include a wing that carries at least first and second of the rotors, each of which is disposed in a rotor assembly configured to tilt at least 90° relative to the wing. In especially preferred embodiments corresponding motors or other powerplants are configured to tilt along with rotor assemblies. At least the primary rotors are open, i.e., as the rotors tilt they are not bounded circumferentially by an air-directing band.

As with the rotors, the wing is relatively large relative to the weight of the aircraft and the payload. It is preferred, for example, that the wing is sized and dimensioned to provide for wing loading no higher than 40 psf, and for wingborne stall speed no higher than 90 KIAS. Especially preferred wings are further configured to provide for wing loading no higher than 20 psf, and for wingborne stall speed no higher than 50 KIAS. Preferred wings are further configured to provide a flight speed margin of no less than 20 KIAS in transition from fully rotor borne level flight to fully wing borne level flight, and wingborne cruise lift/drag ratio of no less than 10. Especially preferred wings are further configured to provide a transition flight speed margin of no less than 40 KIAS.

To further reduce the aircraft stall speed, the preferred wing is fitted with an actuated slotted flap. In the especially preferred configuration, the flap can be used to provide aircraft roll control. The wing is preferably configured with wing tip sections having a control system, and electric or other actuators that adjust the wing tips to an anhedral angle of between 20-90 degrees to: (a) provide for reduced wing down load in hover; (b) provide for roll support in taxi at cross wind; and (c) provide for aircraft tie down.

The wing, rotors and other components and features discussed herein are preferably engineered such that the aircraft can maneuver at 3 g at maximum weight without loss of altitude or speed, but still providing the aircraft with a low sustained autorotation descent rate if a motor fails. The preferred embodiment has a sustained autorotation descent rate of less than 1,000 ft/min.

In some embodiments at least a first battery or other power source is disposed in the wing. Also, in some embodiments, a landing gear extends from at least one of the fuselage and the wing.

In another preferred embodiment at least a first battery or other power source is disposed in a primary rotor nacelle.

Embodiments are contemplated that have a tail and/or a canard, each of which preferably has a lifting surface having an area between 10%-100% that of the wing.

Contemplated embodiments include both manned and unmanned aircraft. Thus, where a fuselage is present, it can have a passenger compartment with at least one seat configured to seat a human.

Electronic controls are also contemplated, sufficient to fly the aircraft without an onboard human pilot.

Figure 11:
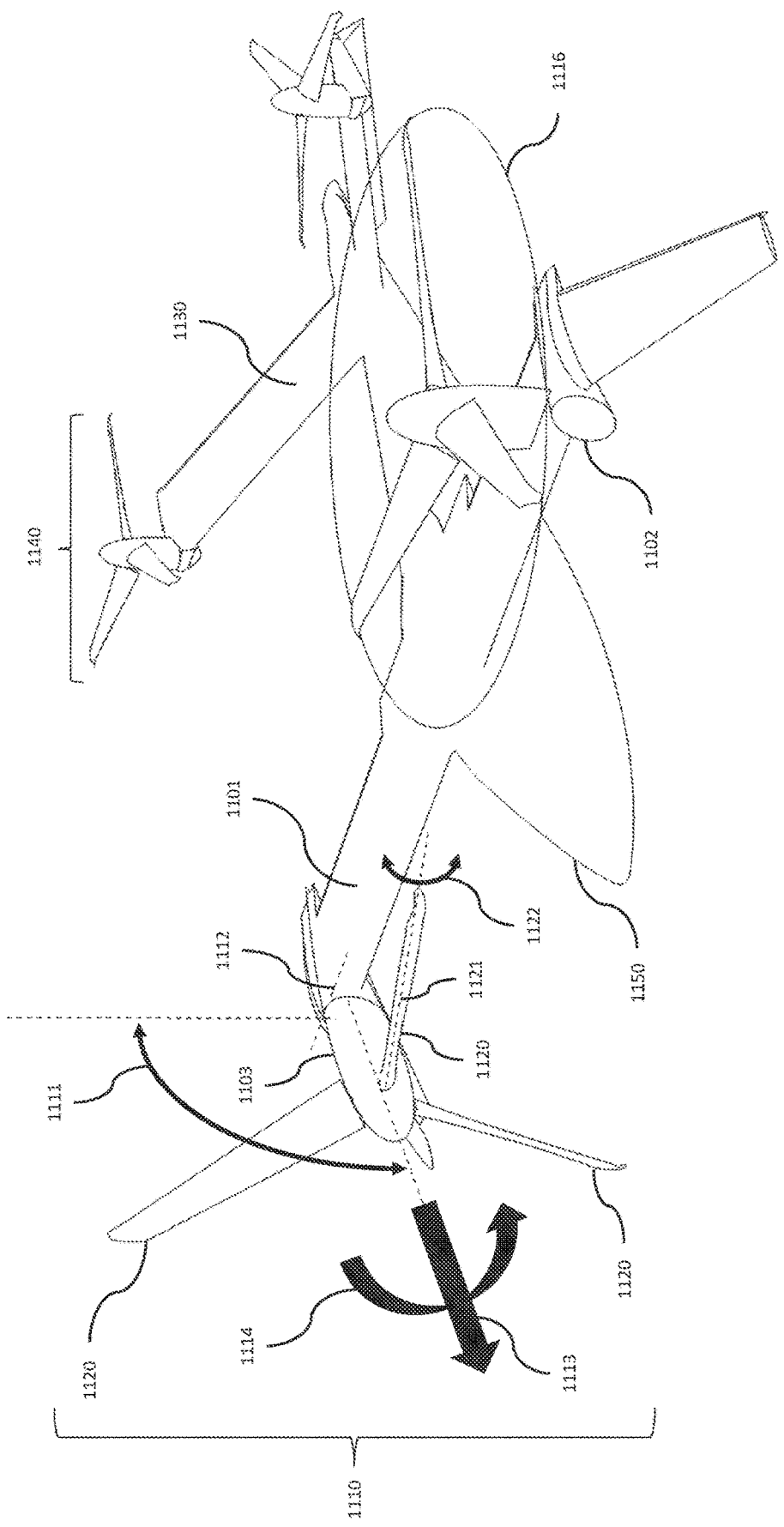
FIG. 11 is a schematic perspective view of a preferred VTOL aircraft according to the inventive concepts herein.

FIG. 11 is a perspective view of a preferred VTOL aircraft according to the inventive concepts herein. The aircraft has a wing 1101, static nacelle 1102, tilting nacelle 1103, fuselage 1150, tail surface 1130, and first tilting rotor system 1110. An especially preferred embodiment includes a first tilting auxiliary rotor system 1140.

Rotor system 1110 includes rotor blades 1120. The rotor blades are of a stiff hingeless variety, including for example that described in U.S. Pat. No. 6,641,365 (Karem). The rotor system collectively provides thrust as indicated by arrow 1113 and force moment 1114. The moments and forces can be controlled by rotating the blades about a feather axis 1121 running the length of the blade 1120. The pitch angle around the feather axis 1121 is represented by arrow 1122. The tip of the rotor blade follows a rotational trajectory represented by a circle 1116. The rotor blades 1120 and tilting nacelle 1103 can tilt along the path represented by arrow 1111 about the tilt axis 1112. To illustrate the tilting rotor function, the right-hand nacelle is in wingborne flight orientation while the left-hand nacelle is in rotor borne flight orientation. The nacelles would be in similar orientations during typical operation.

Wing 1101 transmits loads from the rotor system to the fuselage 1150. Fuselage 1150 is designed to carry payload and passengers and contain various systems including a landing gear.

FIG. 12 is a table of dimensions and parameters of a preferred embodiment, with "*" denoting turbulent flow. The preferred embodiment described by the table is designed for a nominal payload of approximately 1,100 lbs and Basic Mission Takeoff Weight of 4,767 lbs. A wing area of 250 sq. ft. produces a wing loading of 19.1 psf. A total disc area of 849 sq. ft. gives a hover disc loading of 6.62 lb/ft2 when including the effects of rotor wash on the airframe.

Figure 13A:
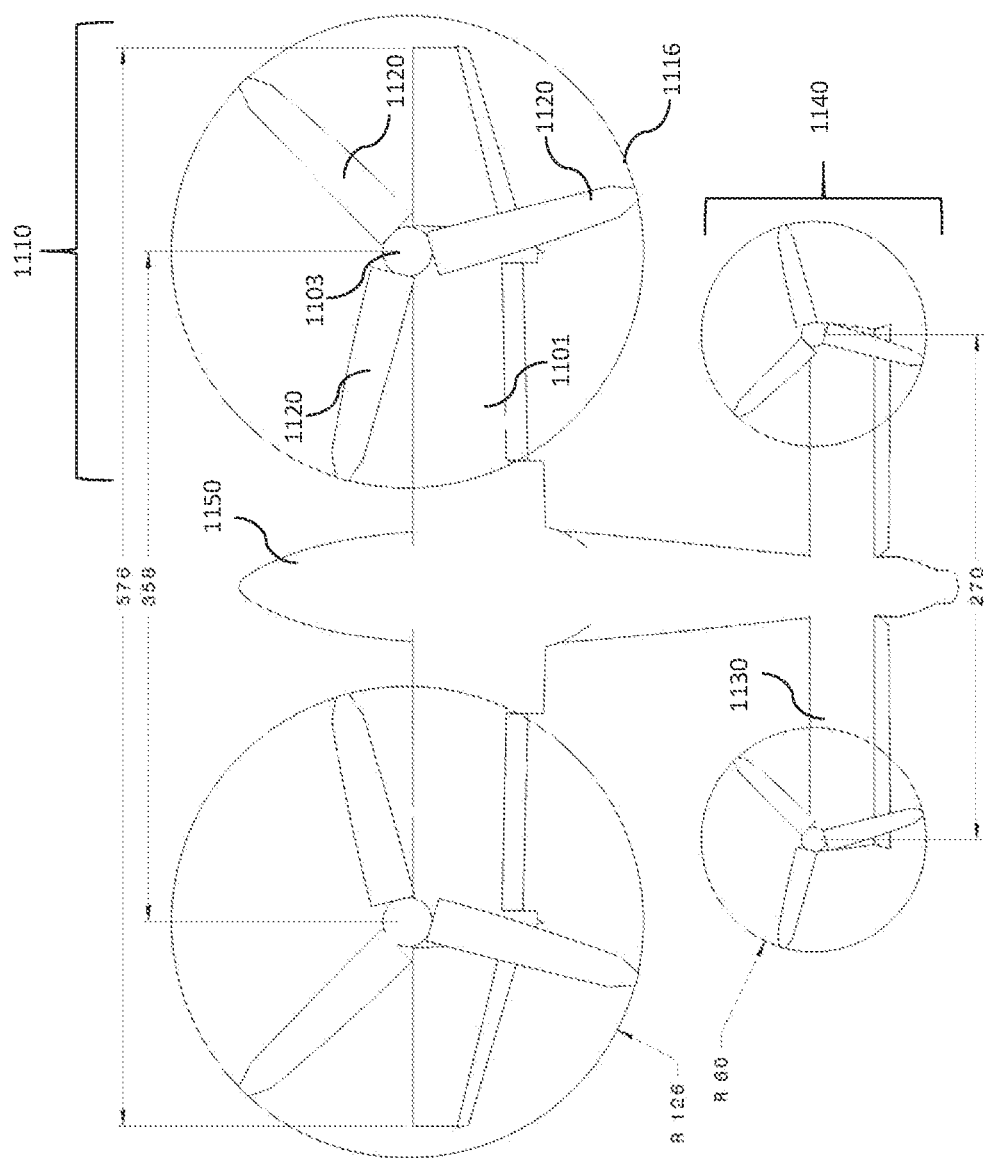
FIGS. 13A and 13B are schematic top and side views, respectively, dimensioned drawings of the aircraft of FIG. 11.
Figure 13B:
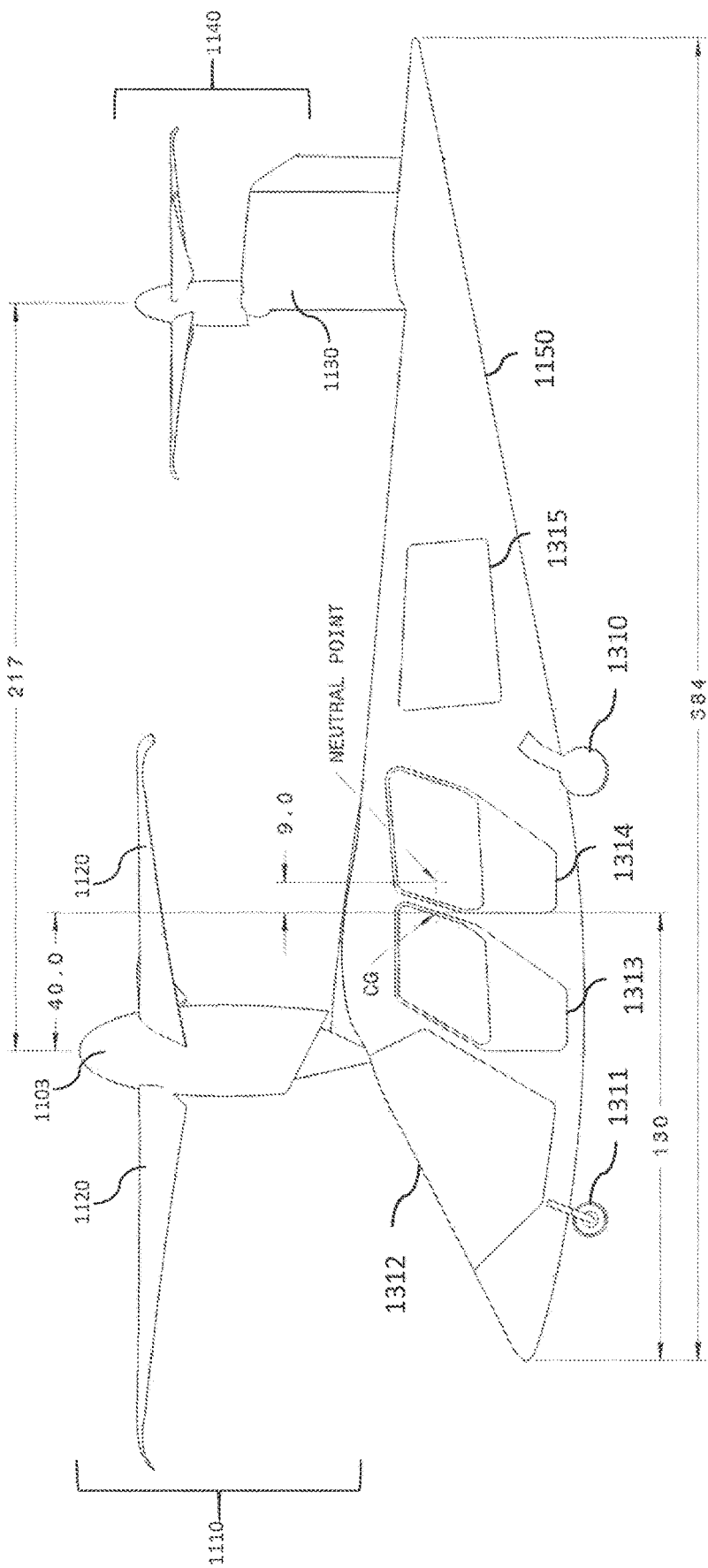

FIGS. 13A and 13B show top and side views, respectively, dimensioned drawings of the preferred embodiment consistent with the aircraft represented in FIG. 11. 1310 is a main landing gear wheel attached to the fuselage 1150. 1311 is a nose landing gear wheel attached to the fuselage 1150. All elements numbered previously are as described above.

FIG. 13B is a side view section showing the 2 upward opening nose hatches 1312, car-like 4 doors, 1313 and 1314, and baggage compartment 1315 of the preferred embodiment aircraft with 3 possible configurations: a) Air Taxi with one pilot and 4 passengers, b) Family Use with up to 8 passengers, and c) Cargo/Ambulance Use with folding aft row seats and optional ramp replacing the baggage compartment. The Family Use configuration, with 1,350 Lb payload capacity, is aimed at accommodating a family in a similar manner to that of a big SUV, except that the aircraft with the 2 nose hatches provides the equivalent of 6 doors as compared to the 4 doors of the SUV.

FIG. 13C is a table describing the preferred aircraft's seating arrangement and calculated weights.

The 1,350 Lb payload capacity, the loading flexibility desired in loading the 3 rows of seating and especially the 400 Lb aft loading of baggage compartment or aft ramp, cause a wide aircraft C.G. shift (loading vector) of up to 8.5 inches (13.2% of wing mean aerodynamic chord). Providing aircraft stability and control with such a wide C.G. shift is made possible in rotor borne flight by the powerful pitch control combination of the preferred embodiment auxiliary rotors and the pitch moment of the rigid primary rotors, and in wingborne flight by the powerful pitch control combination of the large tail elevators and the pitch moment of the rigid primary rotors.

Figure 13D:
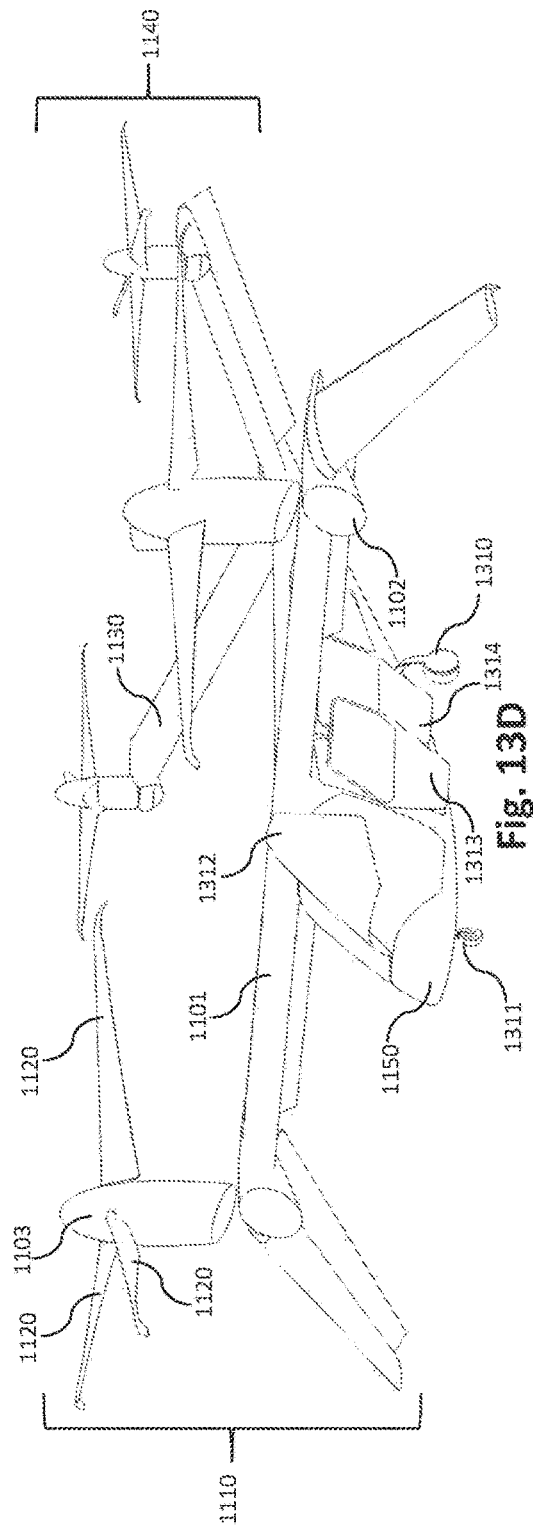
FIGS. 13D and 13E are schematic perspective views of the aircraft of FIG. 11, with doors and hatches open.
Figure 13E:
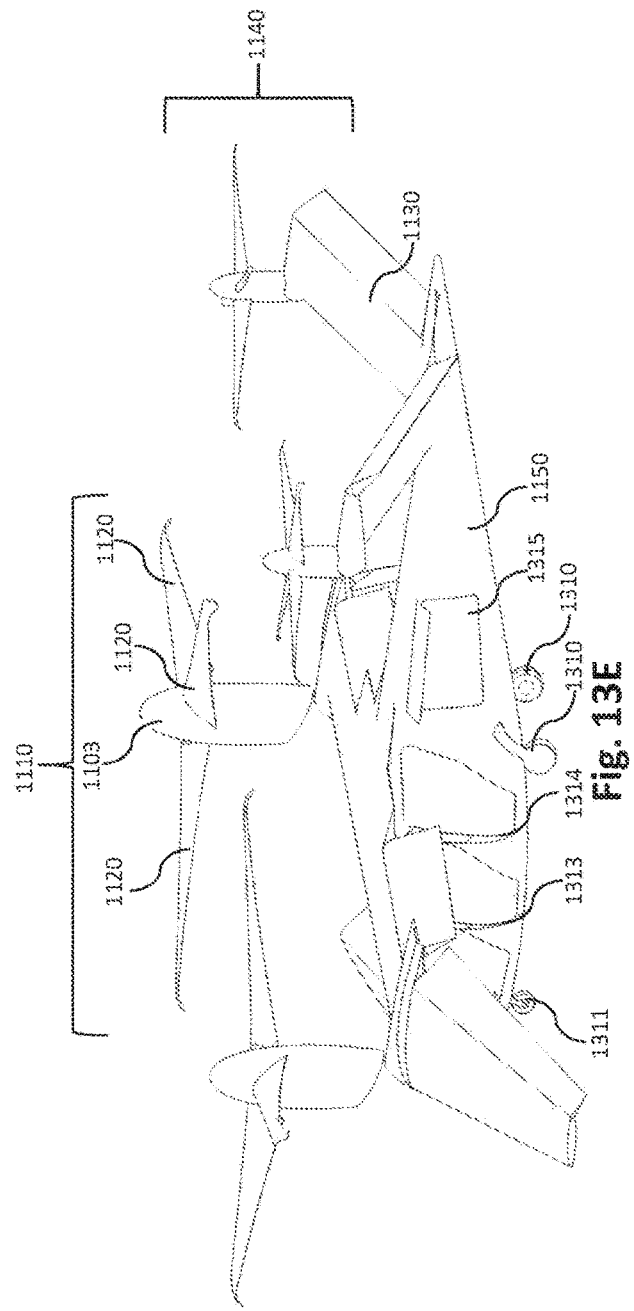

FIGS. 13D and 13E show views of the preferred embodiment aircraft with doors and hatches open.

FIG. 13F shows the aft ramp 1316 open. Nose gear 1311 optionally has variable height, allowing adjustment of the fuselage to ground angle, providing additional clearance at the ramp opening.

FIG. 13G shows a side view section of the fuselage with a proposed seating arrangement consistent with FIG. 13C. Electronics 1317 capable of flying the aircraft without an onboard human pilot are envisioned for future operations.

Aerodynamic Design

Aircraft contemplated herein are designed for efficient vertical and cruise flight. Additionally, such aircraft are designed provide a safe flight and to be well-behaved in the intermediate flight condition between fully wingborne and rotorborne flight known as "transition."

Rotor thrust required for vertical flight is on the order of 10× that required for efficient cruise flight. The preferred embodiment aircraft uses the variable speed rotor described in U.S. Pat. No. 6,641,365 (Karem) to achieve high efficiency from 100 RPM in low speed wingborne flight to 460 RPM in hover at 12,000 feet. The rotor aerodynamic design represents the relatively minor compromise of optimal characteristics for cruise flight typical with the 5:1 RPM range available with such rotor. A combination of airfoil designs which have linear lift characteristics across a wide range of angle of attack and twist and chord distributions which balance vertical and cruise flight conditions are required. Sectional airfoil design and analysis tools such as XFOIL can be used to design and investigate airfoils which achieve the desired characteristics. Rotor analysis software for cruise such as XROTOR and software for hover rotor performance such as CHARM (CDI) can be used to optimize the rotor geometry for desired performance characteristics. The resulting preferred rotor geometry is given as a table in FIG. 16A and airfoil sections in FIG. 18.

For efficient cruise flight, a high lift-to-drag ratio of at least 10 is desired. The drag of the fuselage and the nacelle are minimized by using computational fluid dynamics (CFD) programs, for example STAR-CCM+, to analyze and iteratively optimize the shape subject to practical considerations such as volume for propulsion and payload and for structural requirements. The wing airfoil can be optimized using airfoil tools such as the aforementioned XFOIL. Considerations pertinent to wing optimization include a compromise between cruise drag, download in vertical flight, maximum lift in transition, and structural requirements.

Figure 14:
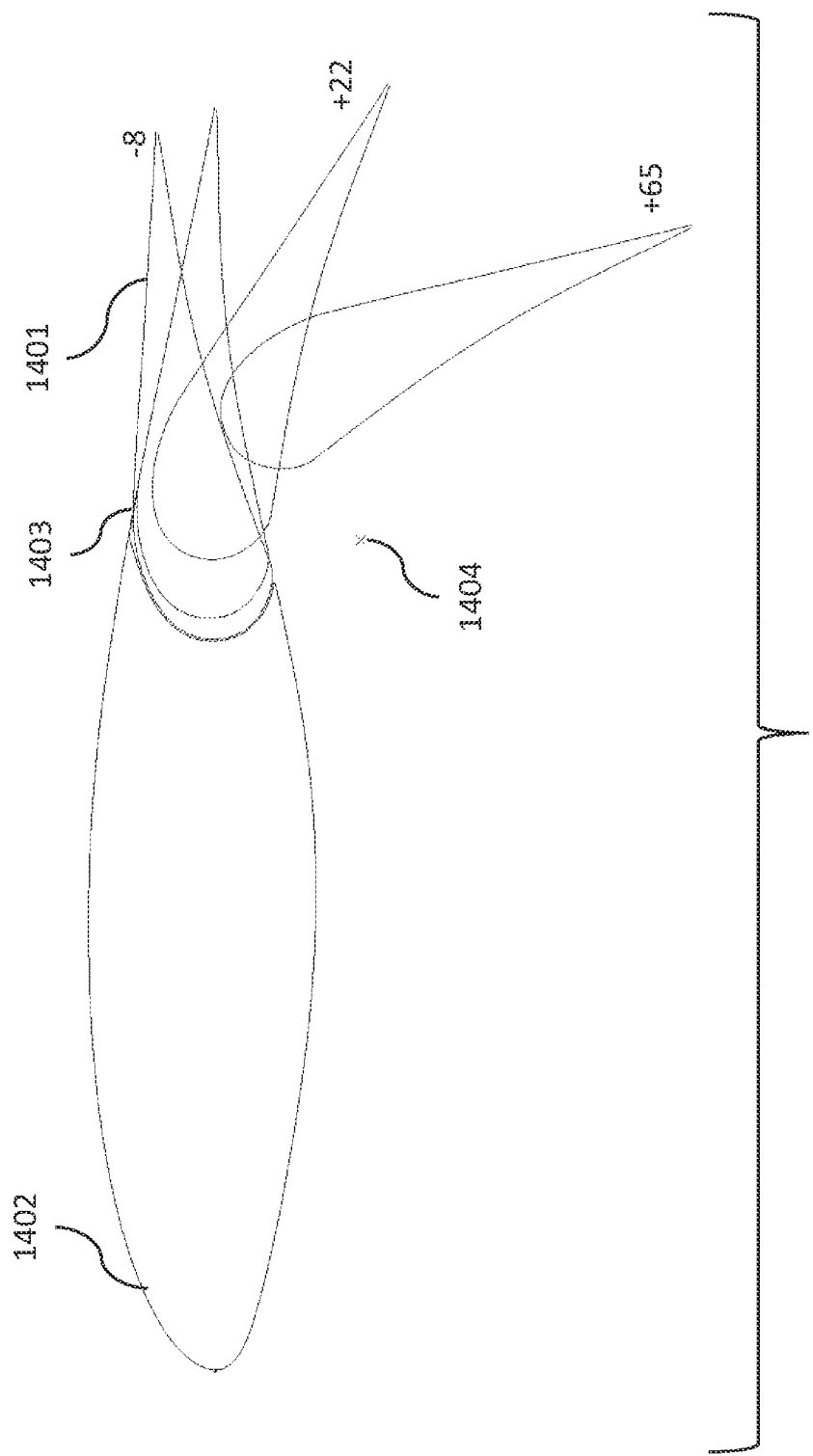
FIG. 14 is a schematic side view of a slotted flap that can be used with the aircraft of FIG. 11, depicted in four different positions.

A preferred method for increasing maximum lift in transition without negatively affecting cruise drag is a slotted flap, as shown in the sectional drawing FIG. 14. The figure includes multiple flap deflection angle positions: maximum up deflection (−8), no deflection (0), maximum CL (+22), and maximum down deflection (+65). The flap 1401 rotates about a simple hinge 1404. When retracted (position 0), the flap 1401 incurs minimal additional drag compared to a single element airfoil. When deployed to an optimal high lift angle (position +22), a slot is exposed which allows airflow from the lower side of the first element 1402 to pass over the flap element 1401. In the preferred embodiment, the flap and slot shape are designed to provide linear lift response to small deflection angles such that the slotted flaps are additionally capable of precise control as ailerons for aircraft roll control. The preferred slotted flap extends spanwise from the fuselage side to the wing tip with an interruption at the propulsion system nacelle. The flap is segmented into multiple spanwise sections to reduce stresses induced by wing deformation. The flap hinge is offset from the wing surface such that a slot opens as the flap is deflected downward. A flexible upper surface seal 1403 minimizes drag when the flap is in its retracted position.

The most flight safety critical phase of a winged eVTOL flight is the transition from fully rotor borne to wing borne at a safe forward speed. This is especially important in turbulent windy conditions, in low altitude urban environments. Unlike the prior art, the use of large primary rotors and large wing area combine to provide safe transition.

Figure 15A:
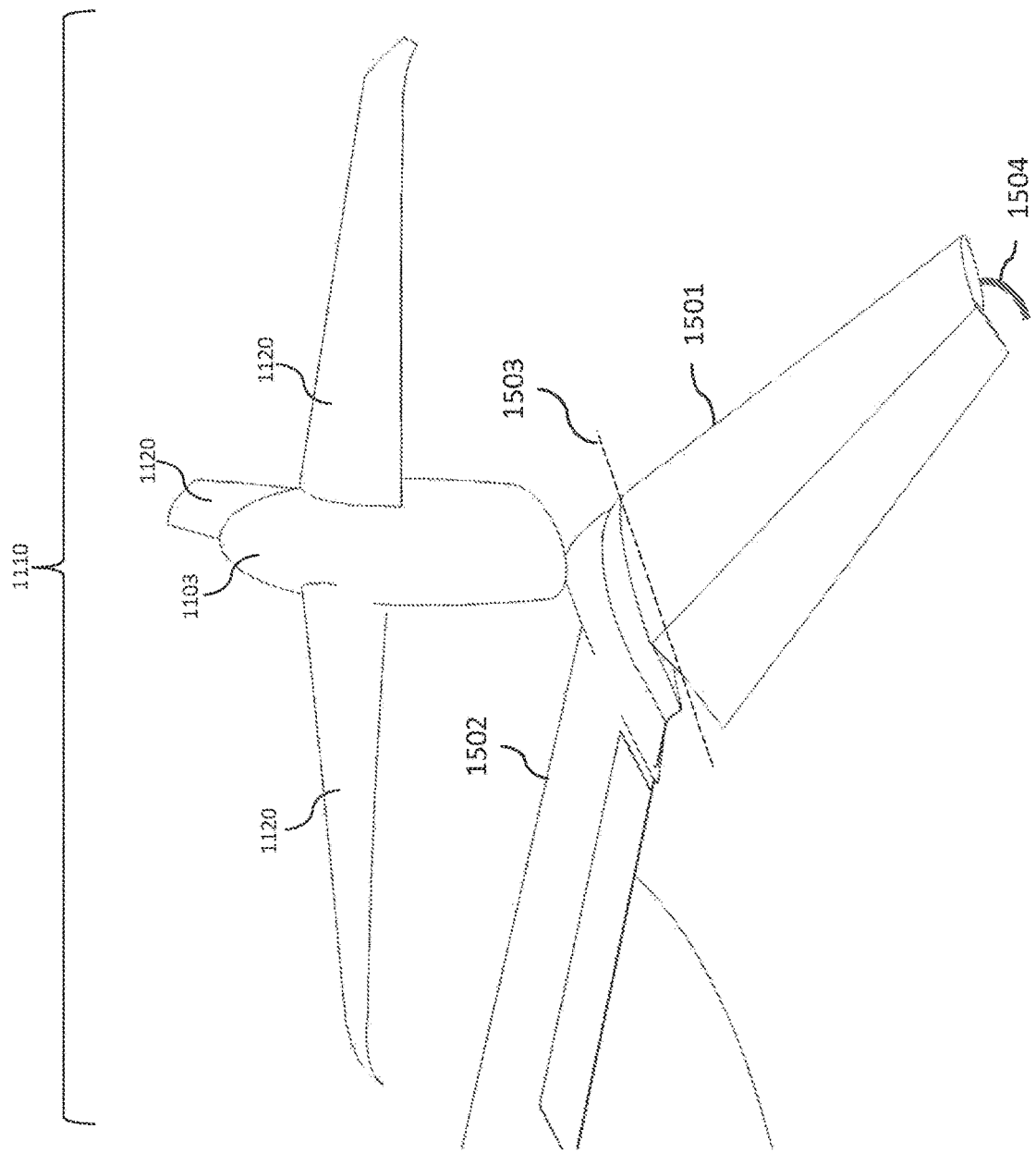
FIG. 15A is a schematic perspective view of an outboard wing fold feature that can be used with the aircraft of FIG. 11.
Figure 15C:
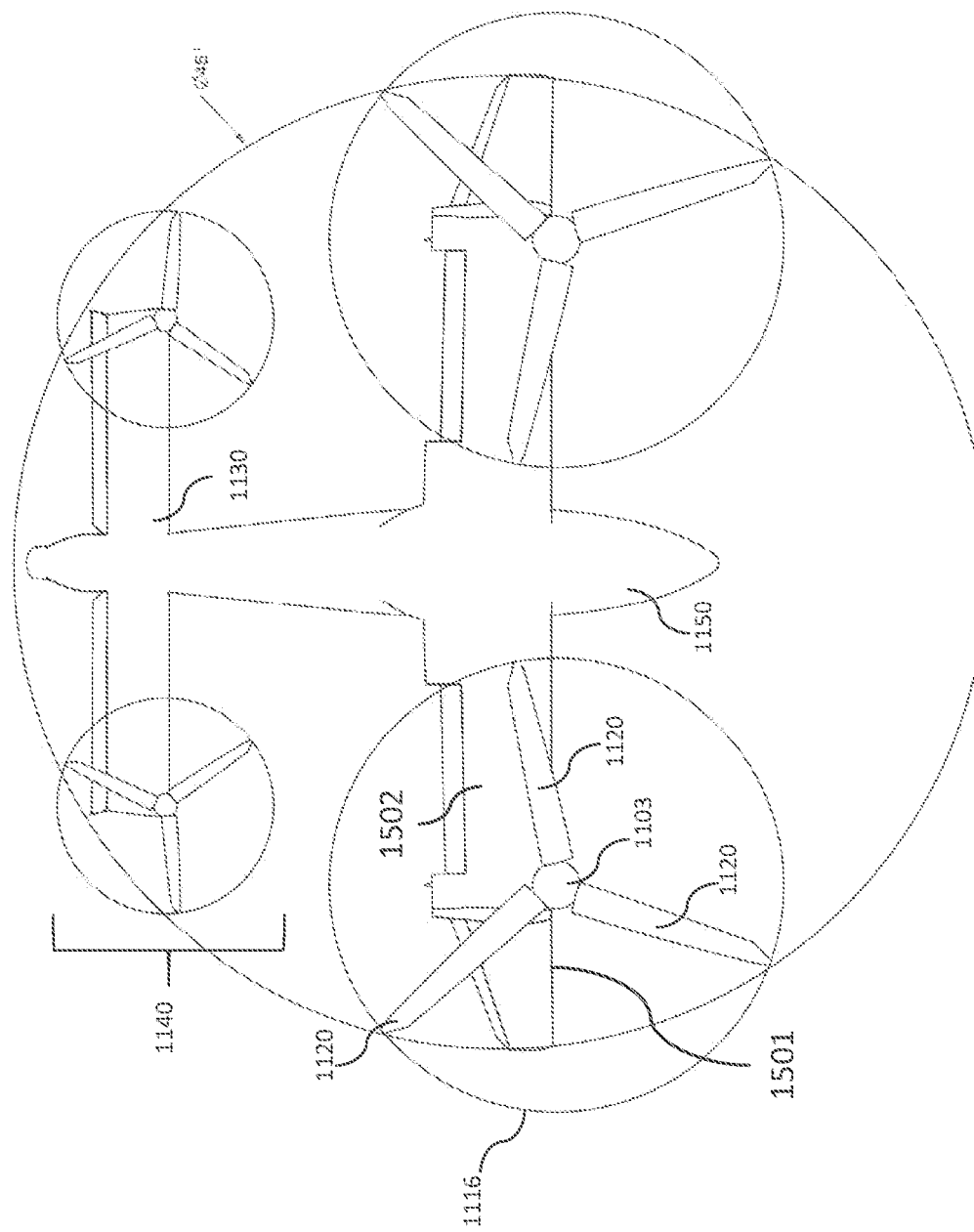
FIG. 15C is a schematic top view of the aircraft of FIG. 11, with the outboard wing in a folded orientation, such that the aircraft fits in a 45' diameter projected circular parking space.

In the preferred embodiment (with 2 auxiliary rotors), the use of large rotors results in disc loading, which produces low noise (350 RPM, rotor tip Mach number lower than 0.35), efficient steady hover, and 2 g rotor borne maneuvering at 495 RPM. In combination with a large (250 Ft^2) wing having a slotted flap at 22 degrees, the aircraft is engineered to provide a stall speed of 50 KIAS at an aircraft weight of 4,767 Lb. At rotor speed of 550 RPM the aircraft can be fully rotor borne (zero wing and tail lift) at 90 KIAS, 40 KIAS higher than the minimum wingborne speed, and can carry 2.5 g instantaneous rotor lift. At 90 KIAS the aircraft can have 3.25 g wingborne lift. These large margins avoid most flight accidents typical of low lift and control accidents typical of low speed flight and transition in turbulent weather Folding Outboard Wing The outboard wing fold feature is depicted in FIG. 15A. The outboard wing 1501 folds with respect to inboard wing 1502 about hingeline 1503, and the motion is controlled by a fold actuator (not shown). The folding wing actuation is designed to withstand flight and ground loads. It features a sprung skid 1504 at the wingtip which contacts the ground upon landing. The large wingspan necessary for efficient flight and acceptable transition characteristics makes the aircraft sensitive to cross wind and wind gust on the ground. Tip skids give the aircraft additional ground stability and safety. The wingtip also includes tie-down features (not shown) for securing the aircraft while parked. In rotor-borne flight, the download due to rotor wash on the outboard wing is reduced because download is inversely related to rotor-wing separation distance. FIG. 15B shows the front view of the aircraft with the outboard wings folded. Additionally, the folded aircraft can fit in a smaller parking area. FIG. 15C shows the top view of the aircraft, which fits in a 45' diameter projected circular parking space.

Blade Design

FIG. 16A gives the rotor geometry and properties as functions of non-dimensional radial station. FIG. 18 shows cross-sectional airfoil profiles of the rotor blade at specified radial stations.

Figure 16B:
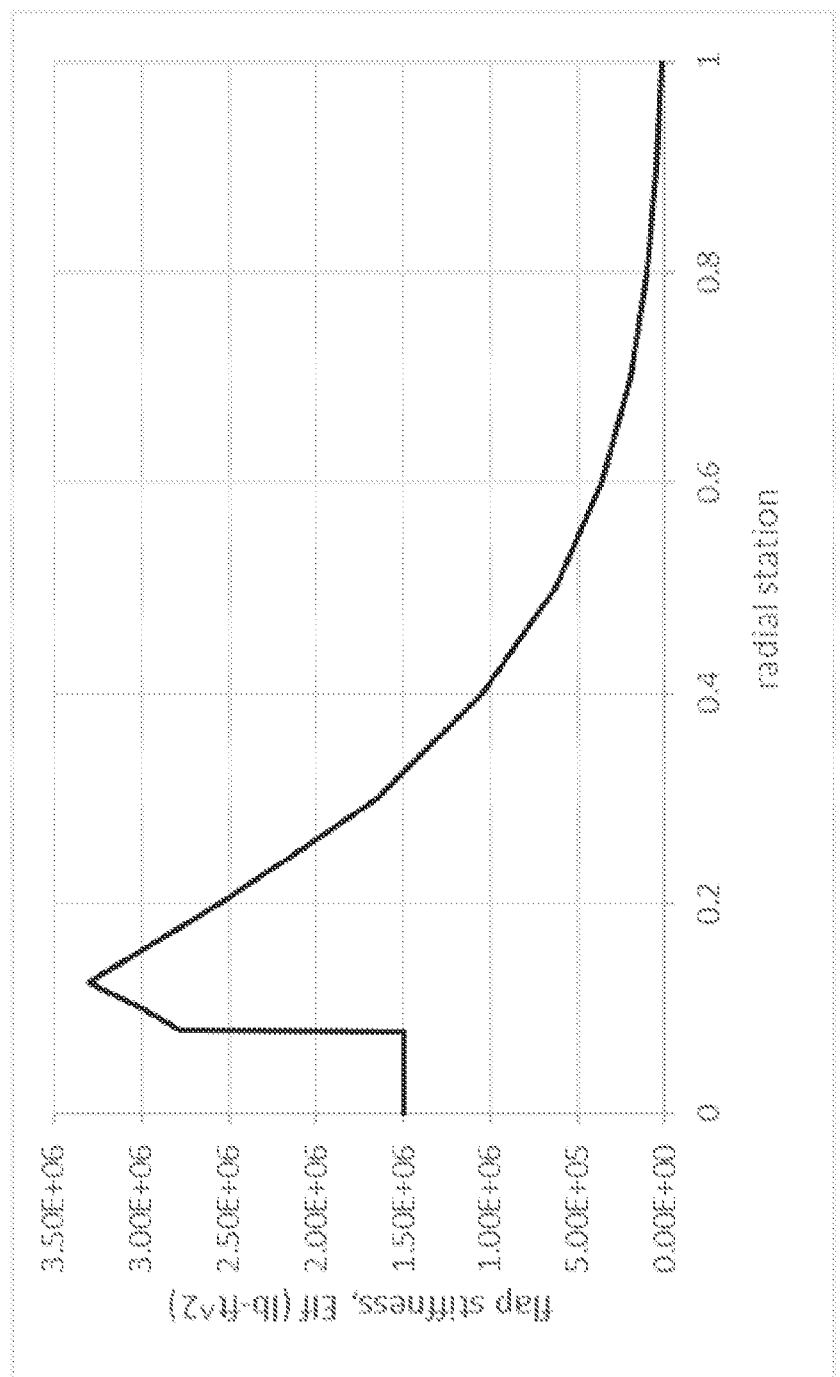
FIGS. 16B-16E are graphs depicting calculated beam flapwise bending stiffness, chordwise bending stiffness, torsional stiffness and mass per unit length of the proposed rotor blades of the aircraft of FIG. 11.
Figure 16C:
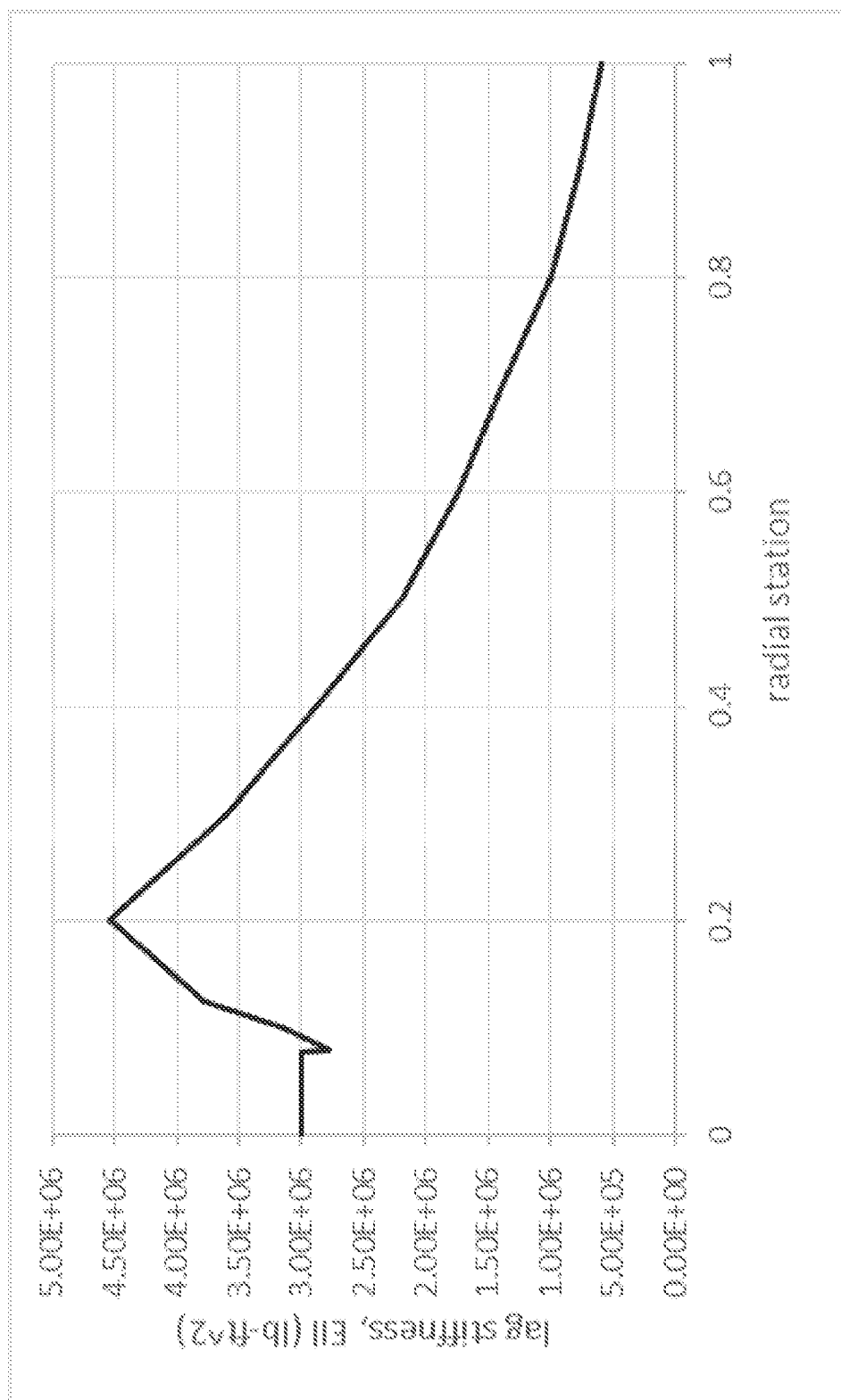
Figure 16D:
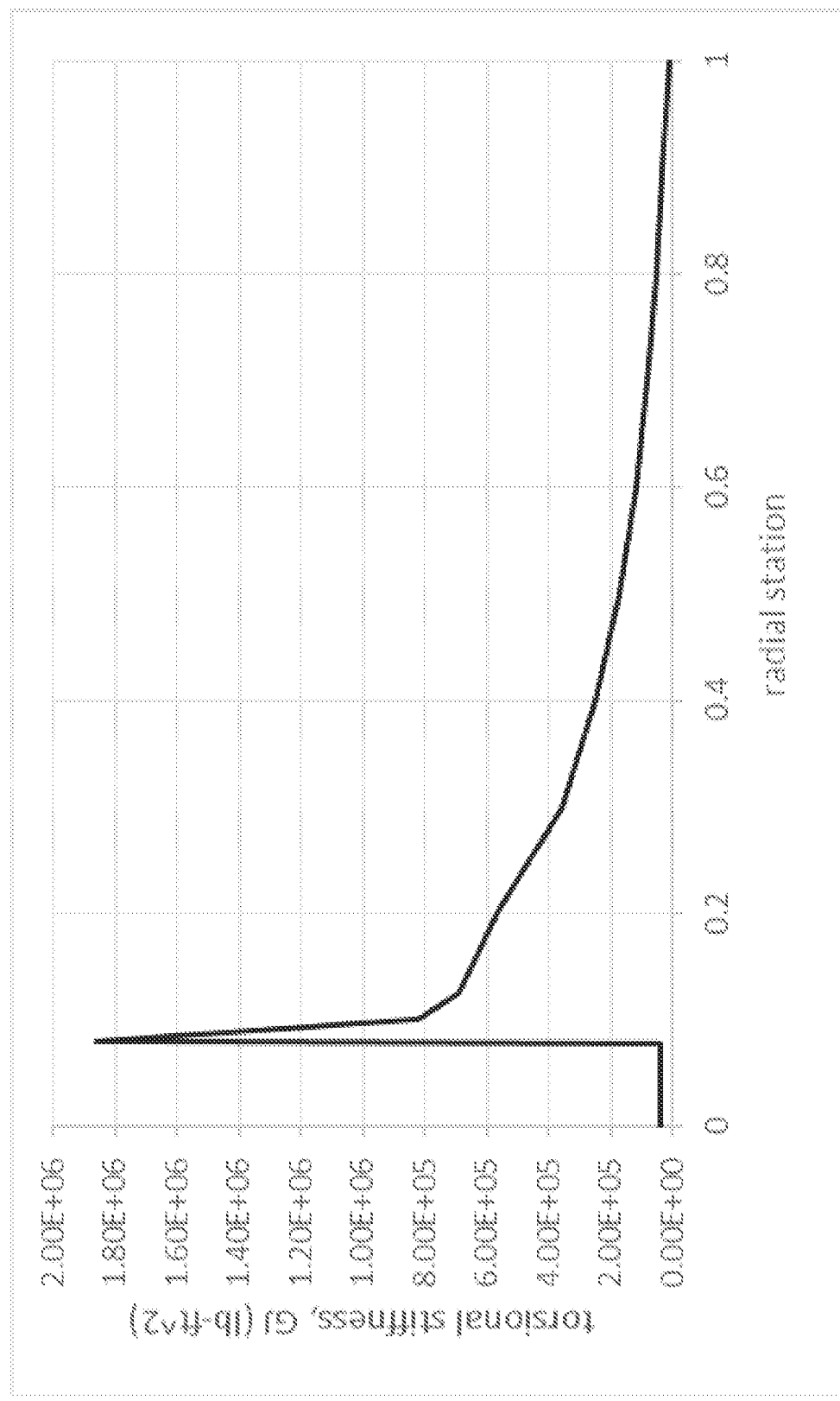
Figure 16E:
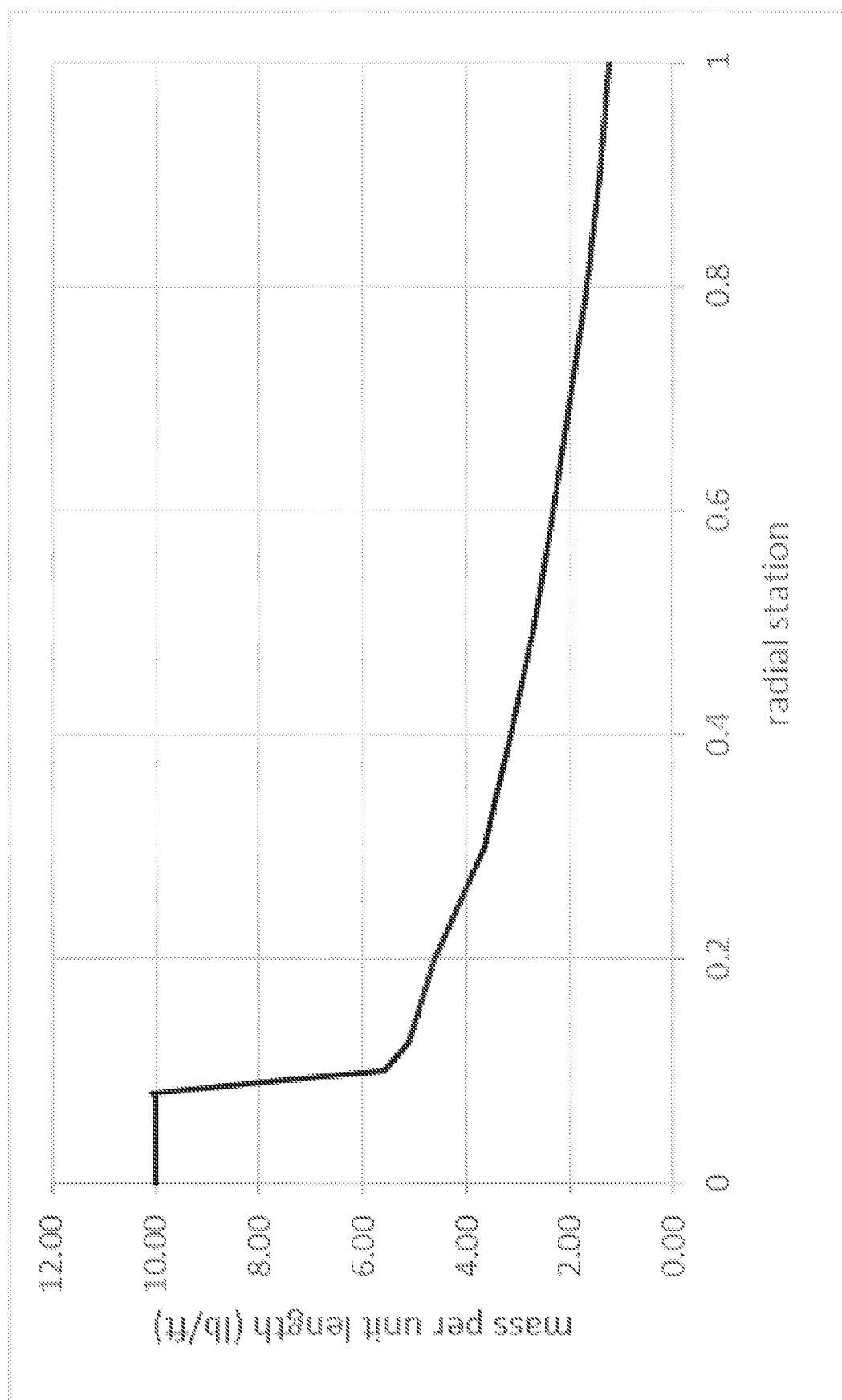
Figure 16F:
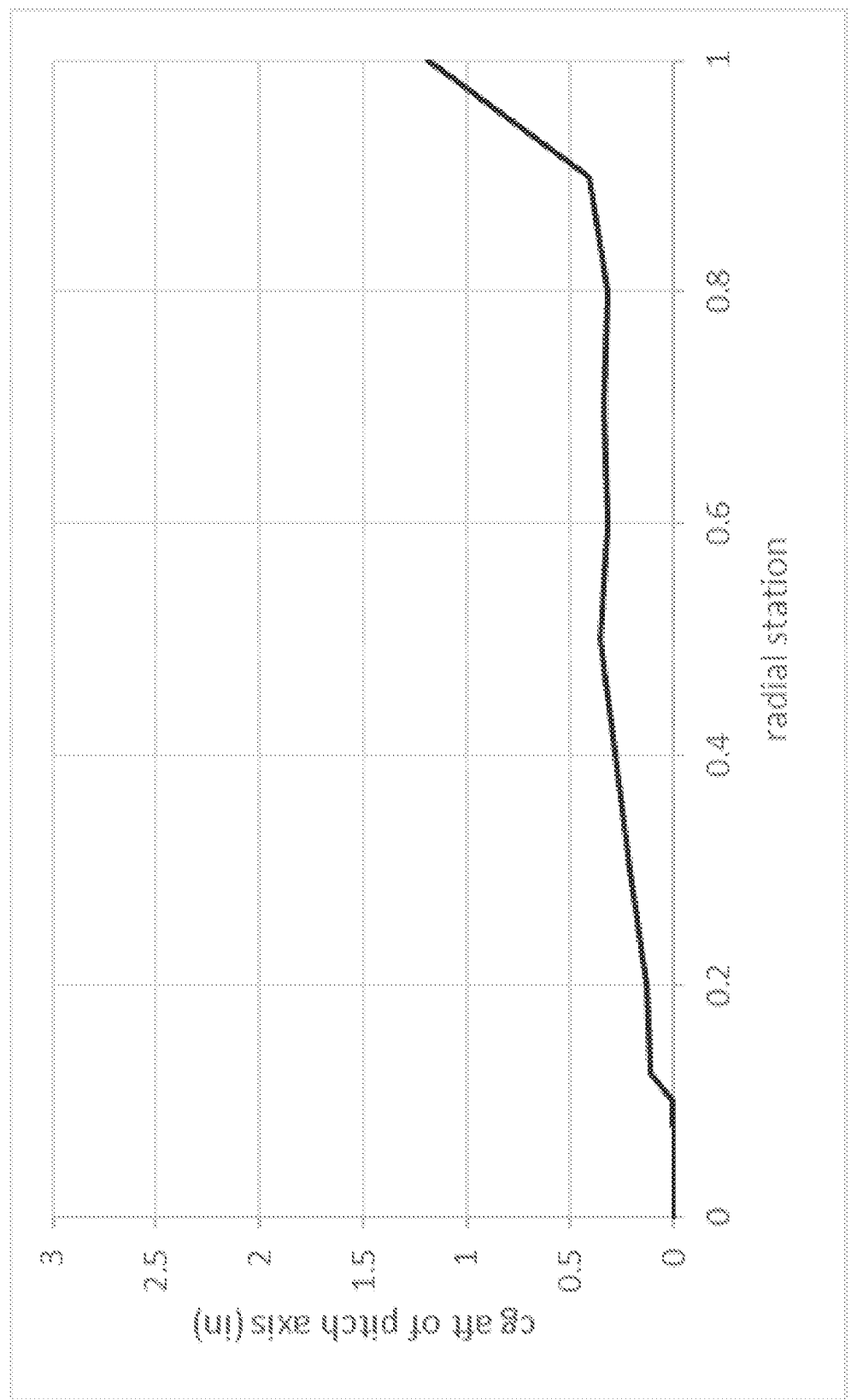
FIG. 16F is a graph depicting calculated center of gravity (cg) of pitch axis versus radial station.

FIG. 16B depicts the flapwise, or normal to the chord, bending stiffness of the exemplary embodiment rotor blade from radial station zero at the root to radial station 1 at the tip. FIG. 16C depicts the lag, or chordwise, bending stiffness of the exemplary embodiment rotor blade from radial station zero at the root to radial station 1 at the tip. FIG. 16D depicts the torsional stiffness of the exemplary embodiment rotor blade from radial station zero at the root to radial station 1 at the tip. FIG. 16E depicts the mass per unit length of the exemplary embodiment rotor blade from radial station zero at the root to radial station 1 at the tip. FIG. 16F depicts the chordwise cg position relative to the blade pitch axis of the exemplary embodiment rotor blade from radial station zero at the root to radial station 1 at the tip.

FIGS. 16C-E depict the beam flapwise bending stiffness, chordwise bending stiffness and torsional stiffness of the proposed embodiment blades. High stiffness to mass is required to avoid structural dynamics problems while operating the rotor over a large range of rotor speeds. The blade mass distribution of the proposed embodiment blade is shown in FIG. 20F. To avoid aeroelastic instabilities, the chordwise center of mass of the rotor blade cannot be much further aft than the blade pitch, or feather, axis. FIG. 16F is a graph depicting calculated center of gravity (cg) of pitch axis versus radial station. The embodiment rotor blade was found to be free of aeroelastic instabilities over the operating conditions with the center of mass balanced as depicted in FIG. 16F.

Figure 17:
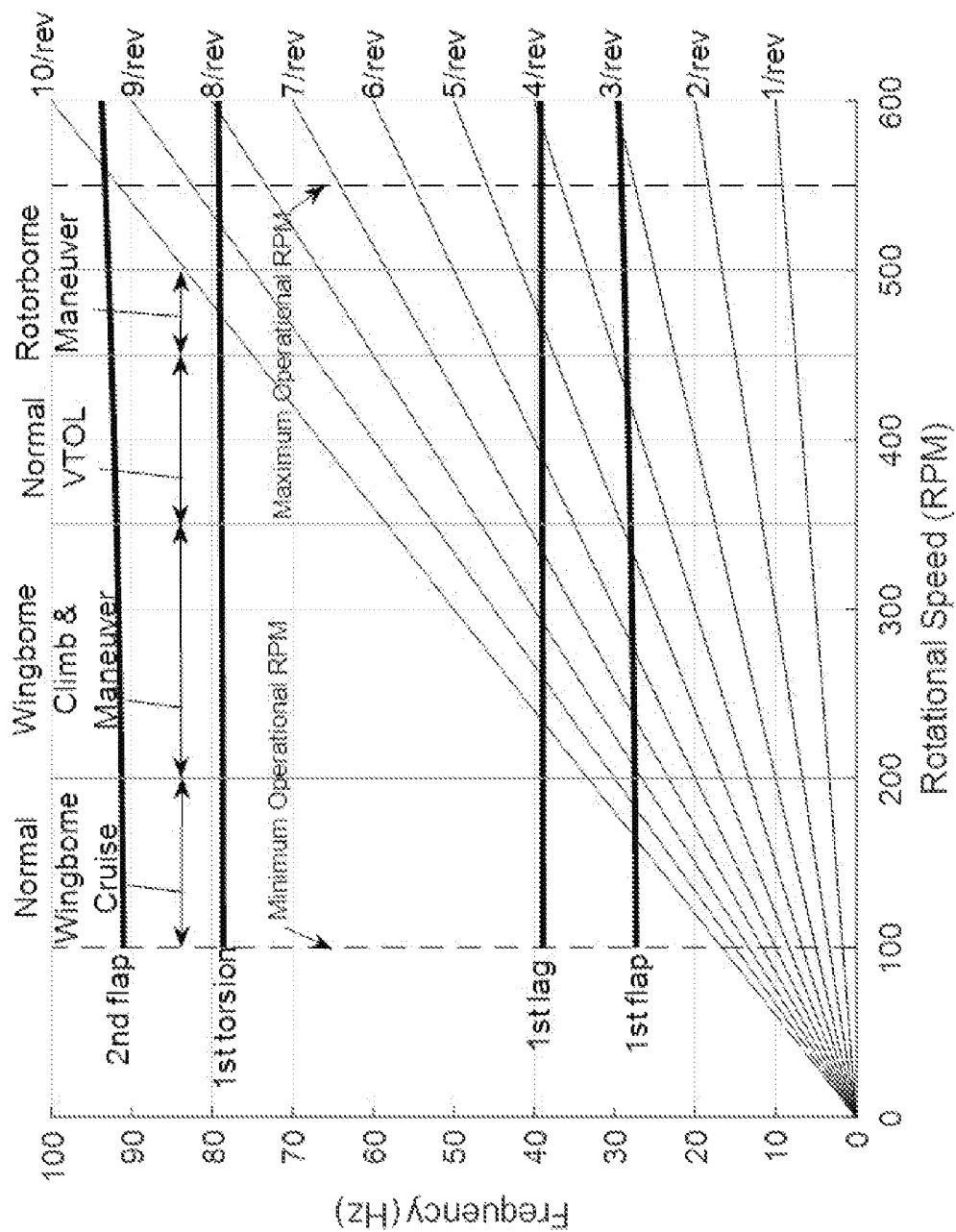
FIG. 17 is a graph depicting calculated lowest blade natural frequencies at a collective control setting of zero degrees as a function of rotor speed, of the aircraft of FIG. 11.

FIG. 17 depicts the lowest blade natural frequencies at a collective setting of zero as a function of rotor speed. The rays emanating from the origin depict the 1/rev, 2/rev . . . 10/rev harmonic frequencies of the rotor. Operating speed ranges are marked on the horizontal axis. The stiffness and mass distributions of FIGS. 16A-F are the primary influences on the rotor blade natural frequencies. The natural frequencies remain well separated from each other across the operating range. As a result of the high stiffness to weight design, the natural frequencies are much higher than typical rotor blades. The first flap mode remains above the 3/rev excitation frequency of the rotor across the entire operating range whereas the more lightly damped first lag mode remains above the 4/rev excitation frequency. This separation above the primary rotor excitation frequency of 3/rev permits operation over a wide rotor speed range without encountering excessive vibratory loads or vibrations due to resonance.

Rotor dynamics simulation and optimization software programs such as CHARM and CAMRAD may be used to iterate the rotor blade design subject to the desired characteristics described. Finite Element Analyses (FEA) software may be used for higher fidelity structural analysis, and CFD codes may be used for higher fidelity aerodynamic analysis and refinement.

The preferred auxiliary rotor and blades are designed following the same performance constraints as the primary rotor with a smaller diameter.

Hub Drive System

Figure 19A:
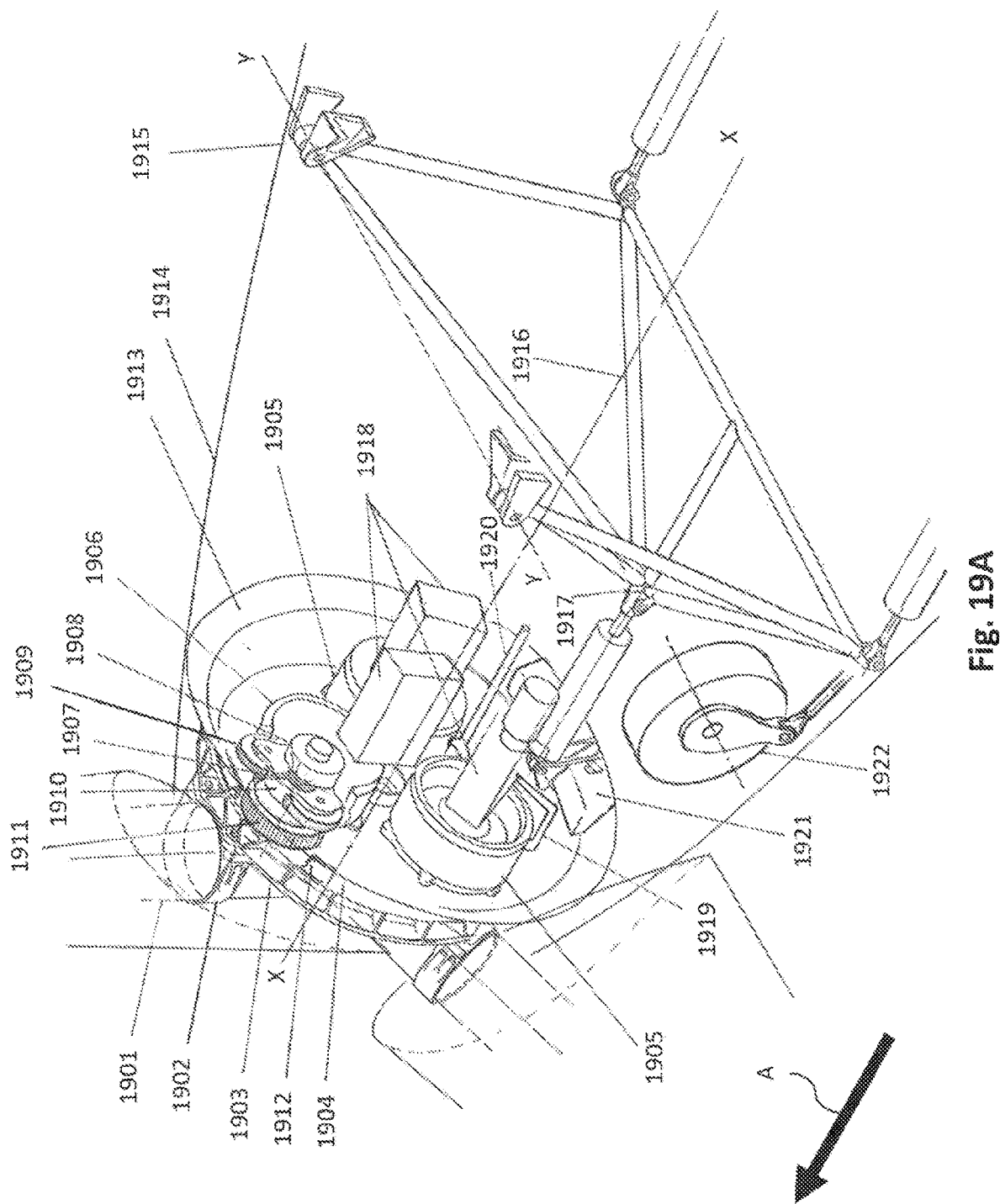
FIG. 19A is a first schematic perspective view of the drive system that can be used with the aircraft of FIG. 11, enclosed in a streamlined nacelle, in position required for wing-borne flight.

The drive system is enclosed in a streamlined nacelle, illustrated in FIG. 19A in the position required for wing-borne flight. The axis of rotation of the rotor is show as X-X and the direction of flight by Arrow A. Tilt rotor aircraft, by definition, require the thrust axis of the rotor to be rotated from the horizontal flight condition to the vertical lift condition. This angle is not less than 90 Deg. and can be 105 Deg. or more. The axis about which the forward section of the nacelle tilts, including all drive elements, is shown as Y-Y.

Blade Shanks, 1901, are mounted in Feather Bearing Containment Hoops, 1902, which are bolted to the rotating Hub, 1903 supported on large diameter Bearing, 1904. The three Motors, 1905, are symmetrically disposed about the hub center, one of which is shown sectioned, 1906. The output Sun Gear, 1907, is driven via Sprag Clutch, 1908. The Planet Gears, 1909 are mounted in Planet Carrier, 1910 which is attached to Output Pinion, 1911. The three identical output pinions mesh with Ring Gear, 1912. Hub loads are carried from the hub bearing through Intermediate Structure, 1913 which is attached by bonding and riveting to Nacelle, 1914, of monocoque composite construction. The shell structure is attached to the aft nacelle at Hinge Points, 1915, with the tilt actuation Truss, 1916, connecting both nacelle elements at actuator Attachment Bracket, 1917. The electronics motor Driver Boxes, 1918, are individually packaged for redundancy, with Phase Connections, 1919 to the motors.

The motor Liquid Cooling connection, 1920, is illustrated, as is the Oil Containment Sump, 1921. The alternative Rotary Tilt Actuator, 1922, is shown mounted on a transverse axis of rotation.

Figure 19B:
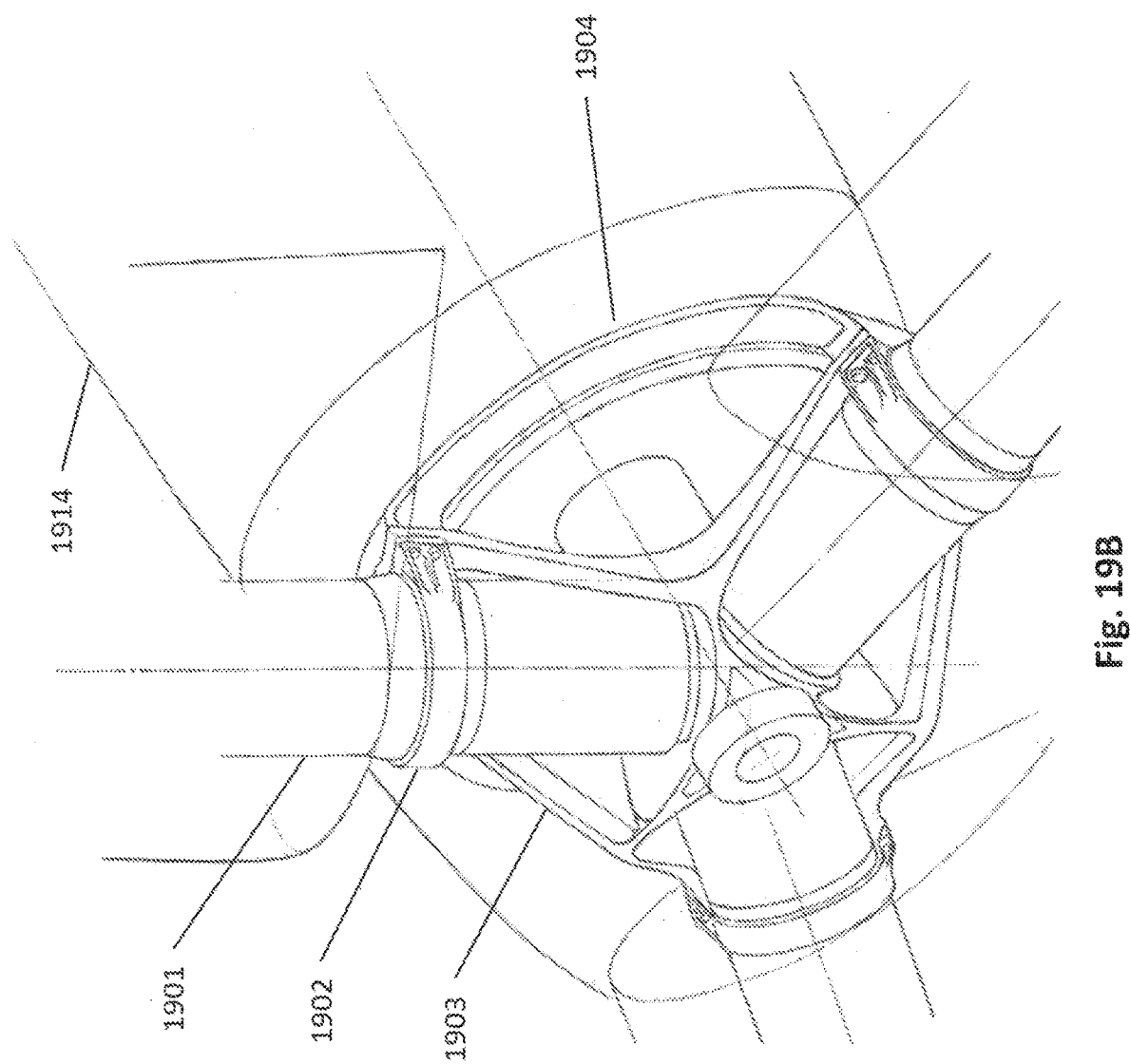
FIG. 19B is a second schematic perspective view of a portion of the drive system that can be used with the aircraft of FIG. 11.

FIG. 19B depicts an alternative perspective view of a portion of the streamlined nacelle depicted in FIG. 19A. FIG. 19B provides a closer view of Blade Shanks 1901 as mounted in Feather Bearing Containment Hoops 1902, as well as the bolting of Feather Bearing Containment Hoops 1902 to rotating Hub 1903, which is supported on large diameter Bearing 1904.

Figure 20:
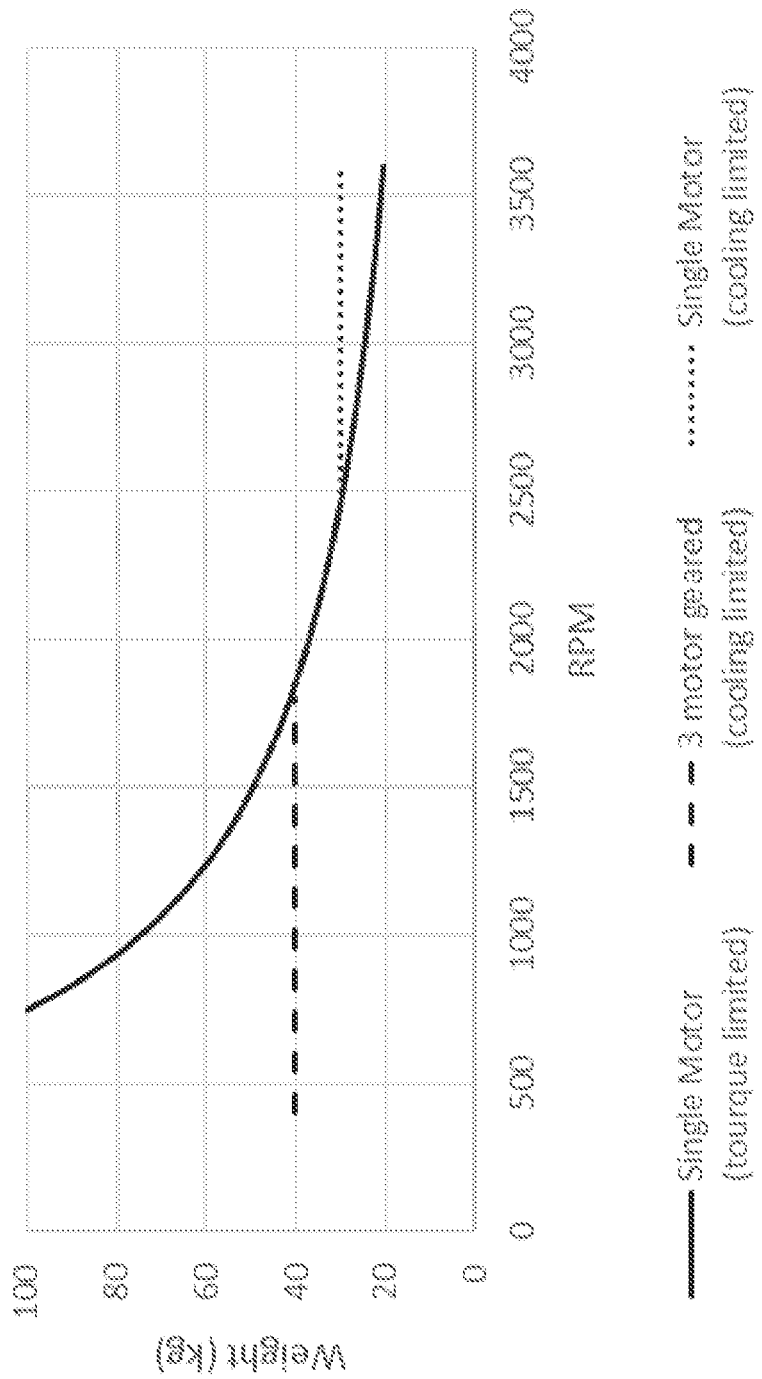
FIG. 20 is a graph depicting calculated effects of motor speed on motor weight, for the aircraft of FIG. 11.

The entire rotor hub, including the blade feather bearings and pitch actuation system coupled with the electric drive, form an integrated assembly. The system is illustrated as a three-bladed arrangement; other blade numbers are similarly installed. The four predominating loads resolved through the assembly from the rotating frame to the nacelle structure are the blade flap loads, the mast moment, the thrust or lift vector and the drive torque. A large diameter, moment-carrying bearing connects the rotating hub elements to the nacelle structure. The large, slow-turning rotor creates a drive condition where the rotor torque/speed characteristics are well beyond the capabilities of a direct-drive motor. An analysis summary of the effects of motor speed on motor weight is shown in FIG. 20, indicating that for constant power, the high-speed motor with gear reduction offers weight reduction with increasing gear ratio, and, further weight reduction is realized by multiplexing the motors. Because flight safety is of prime importance, multiplexed motors offer complete electrical redundancy. A degree of mechanical redundancy is also provided by the inclusion of a one-way clutch ("sprag" clutch) on each of the motor output shafts. The system illustrated has three motors but is adaptable to a larger complement of motors.

The typical application of a direct drive electric motor for eVTOL lift rotors has several advantages. It is simple, and with simplicity comes inherent reliability. Also, it avoids the additional weight of a gearbox. However, a weight reduction is also available by increasing the electric motor RPM and gearing the output stage. By trading torque for RPM at fixed power, significant weight savings are available. There is a limit to the weight reduction based on the limited ability for cooling as size decreases. Therefore, for weight optimization, the choice between a direct drive and geared motor depends on the desired power output and desired RPM. At lower output RPM a geared drive provides a weight advantage and at higher RPM a direct drive is more weight efficient. FIG. 20 shows the weight of the motors and drive of the 300 HP rated output of the primary rotor in the preferred embodiment. In this case the weight breakpoint is near 2000 RPM. In the preferred embodiment the primary rotor RPM in high-power hover is 400-460 and the RPM in high-power wingborne climb is 350, resulting in a clear preference of a geared rotor drive.

There are several advantages to incorporating more than one motor in the design. A) More motors can be more weight efficient. The ability to dissipate heat scales with the surface area of the motor and the power, for fixed RPM, scales with the volume, and therefore the weight, of the motor. A greater surface area to volume ratio allows for better cooling. In the case that the minimum weight is determined primarily by the ability to cool, more motors provide better weight efficiency because they have a higher surface area to volume ratio. B) Reliability can be increased through redundancy. In a configuration in which acceptable output power can be maintained with one or more drive motors failed, overall reliability is increased through redundancy. However, the complexity of many motors can reduce reliability.

The higher the gear ratio the better the weight savings. Because the gearbox weight is driven by the high-torque output stage, to first order, the gearbox weight is independent of the gear ratio. As shown in FIG. 20, the weight of the motors scale inversely with RPM. However, the weight savings is limited by the reduced ability for heat dissipation as size decreases. In addition, there are practical limitations to motor RPM that include: retention of magnets under high centrifugal force (for motors of that design type), limitations in available bearing speeds, and limitations of electronic switching speeds for motor commutation.

In the current example a gear ratio of 20:1 provides weight reduction while limiting the challenges of very high motor RPMs. In other contemplated embodiments, the gearbox may have ratios of 3:1, 5:1, 10:1, 20:1, or 30:1.

With an overall gear ratio close to or exceeding 20:1, two stages of gear reduction are required for the full weight-saving benefits of high-speed motors to be realized. Each motor is equipped with a planetary reduction set driving a combining ring gear attached to the hub. All features of the assembly are optimized for minimum weight, for example, the use of three driver pinions engaging with a single large ring gear minimizes the face width of the ring with consequent material saving.

The motors, their driver electronics and the gearbox in total require cooling. The preferred fluid for motor and electronics cooling is water/glycol, and a further liquid-to-oil heat exchanger is employed for gearbox oil cooling. Gearbox oil is contained in a sump located at the lower aft extremity of the gearbox housing.

The nacelle tilt system is shown as system of three linear actuators, the aft. pair providing 60 Deg. of nacelle travel and the fwd. actuator the remaining 55 Deg. An alternative system is the application of a high-torque rotary actuator operating through a four-bar linkage. The rotary actuator, U.S. Pat. No. 7,871,033 (Karem et al.) which describes its execution in detail, is cited in the references.

Individual Blade Control

Figure 22:
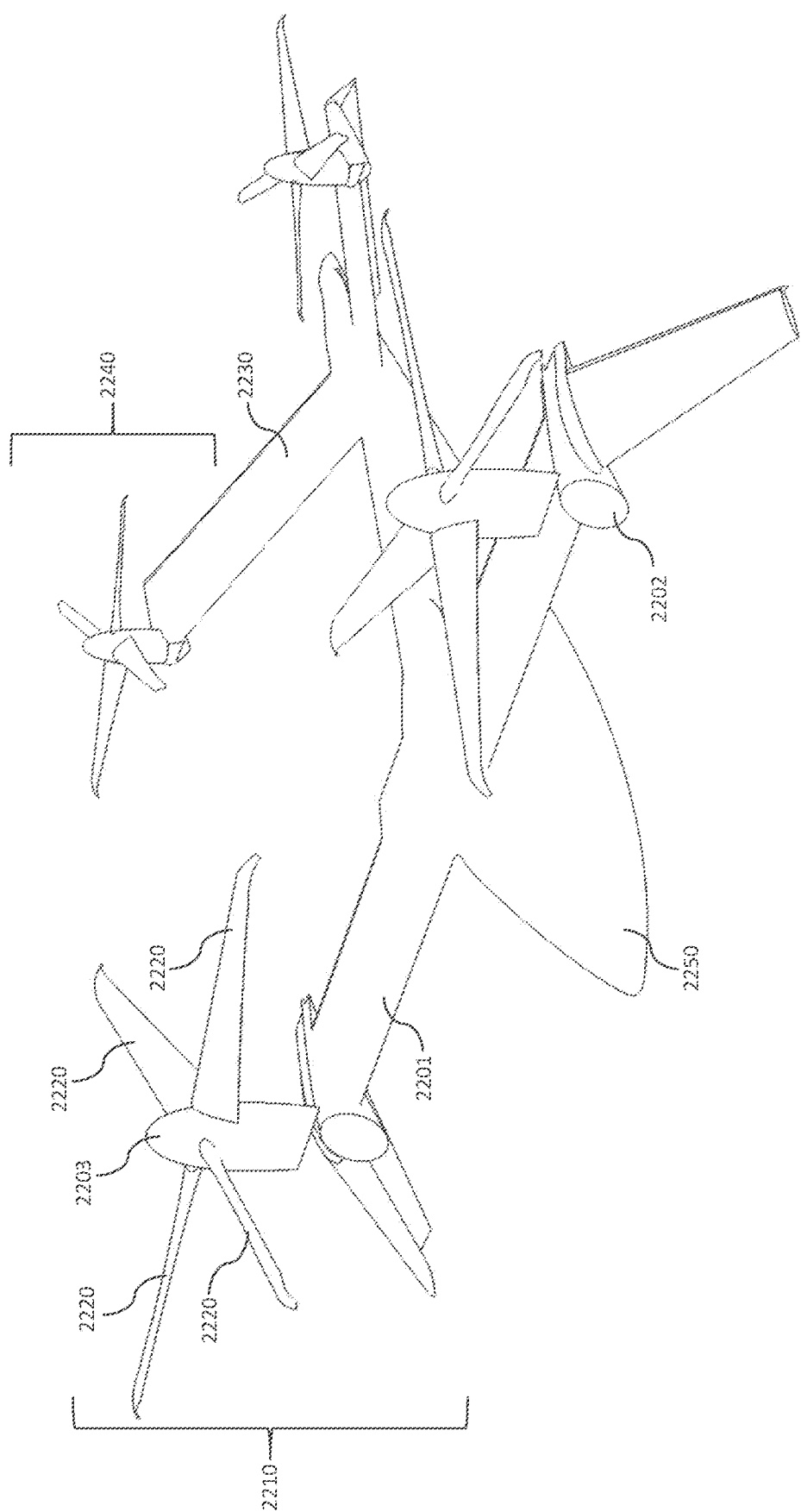
FIG. 22 is a schematic perspective view of the aircraft of FIG. 11, having individual blade control (IBC) actuators according to FIG. 21A or 21B, having four-blade primary and four-blade secondary rotors.
Figure 24B:
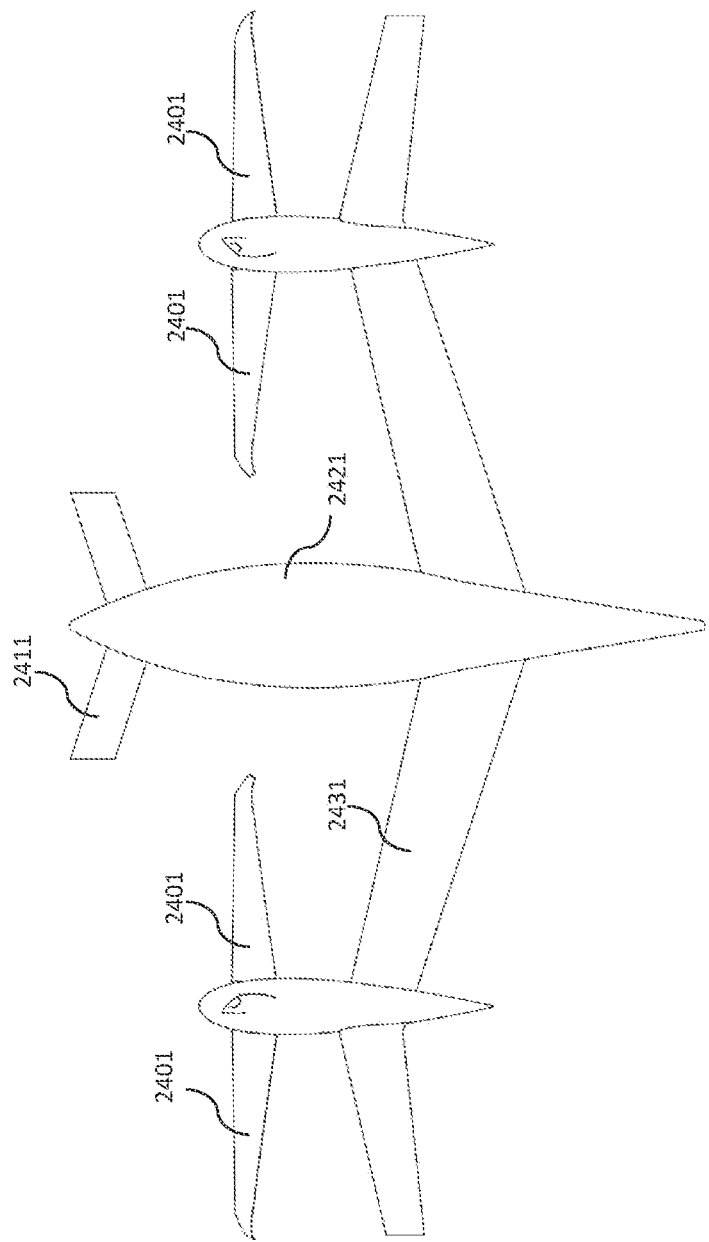
Figure 24C:
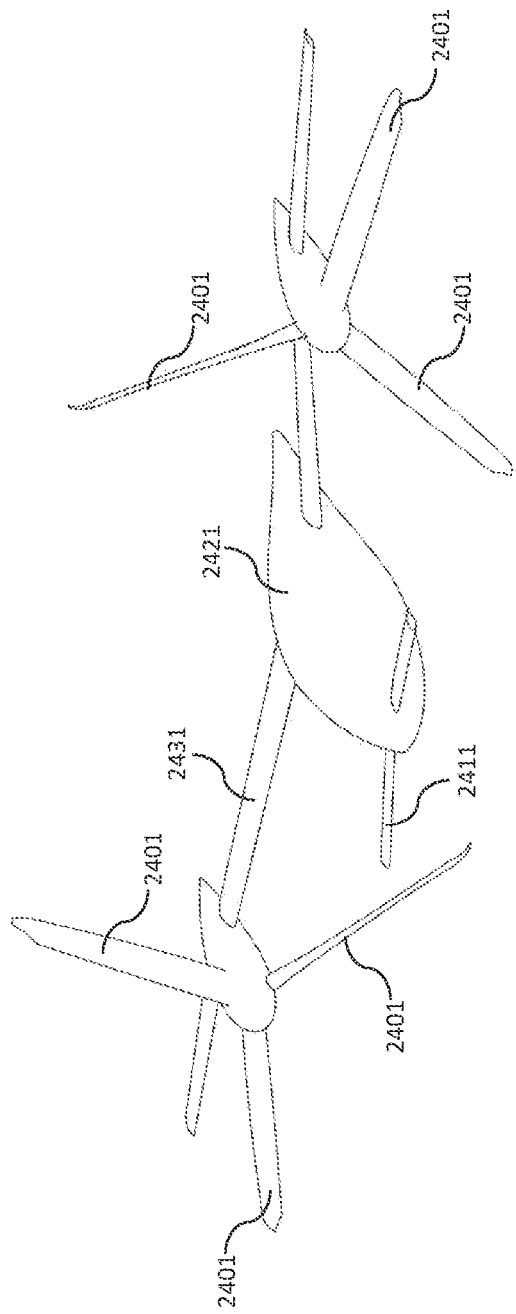
Figure 24D:
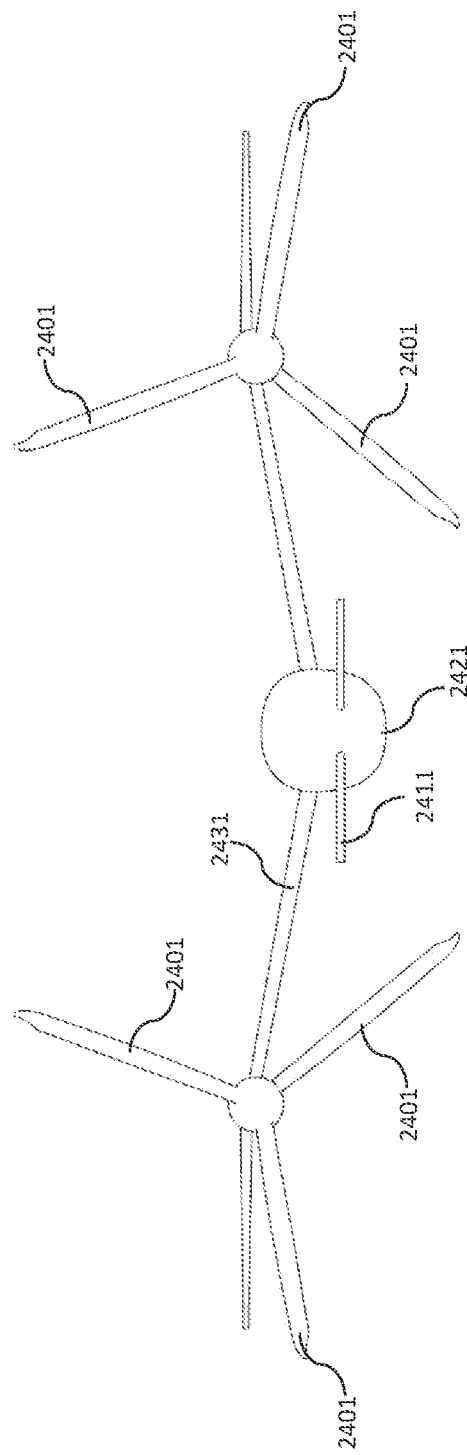
Figure 24E:
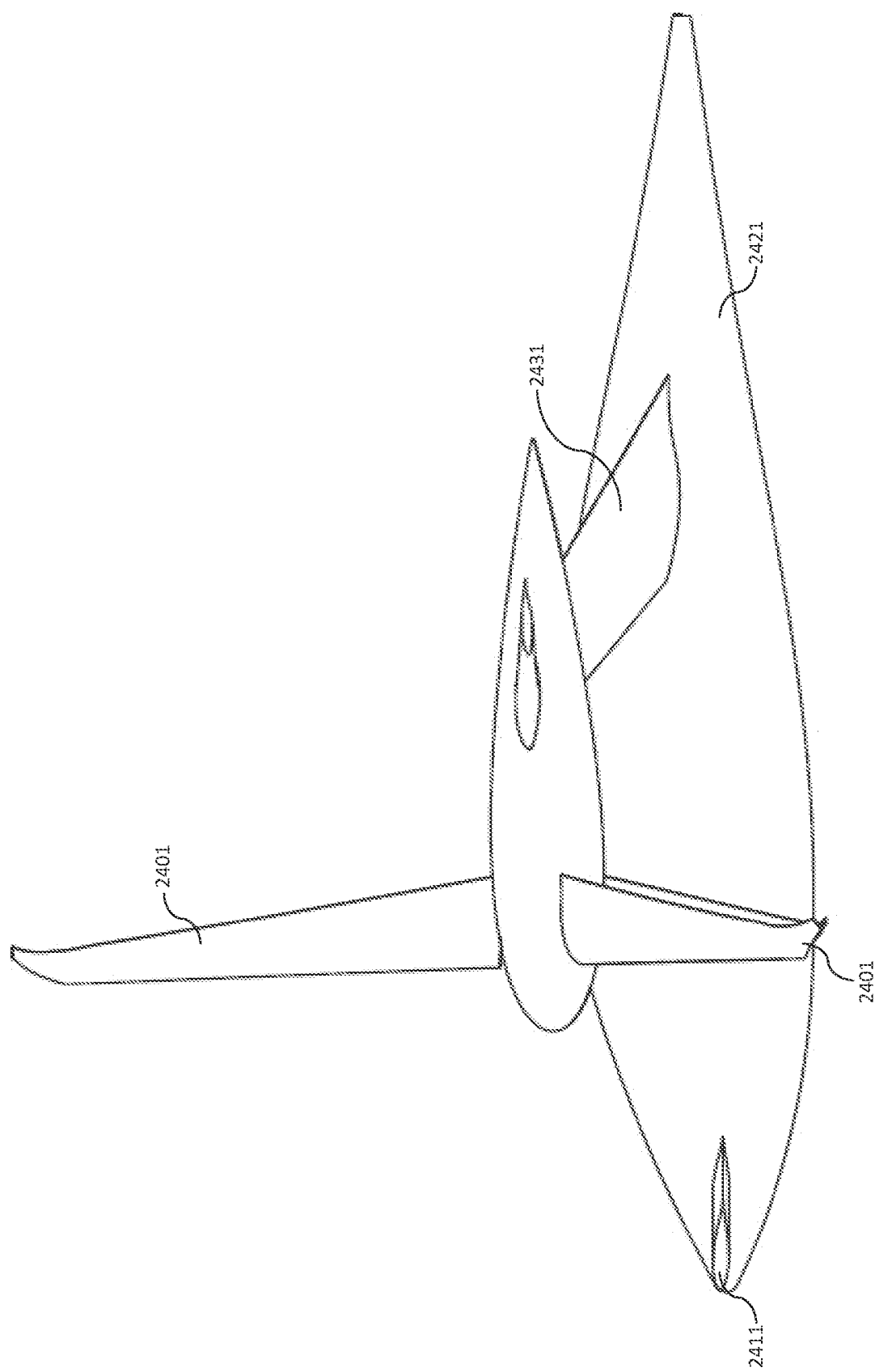
Figure 24F:
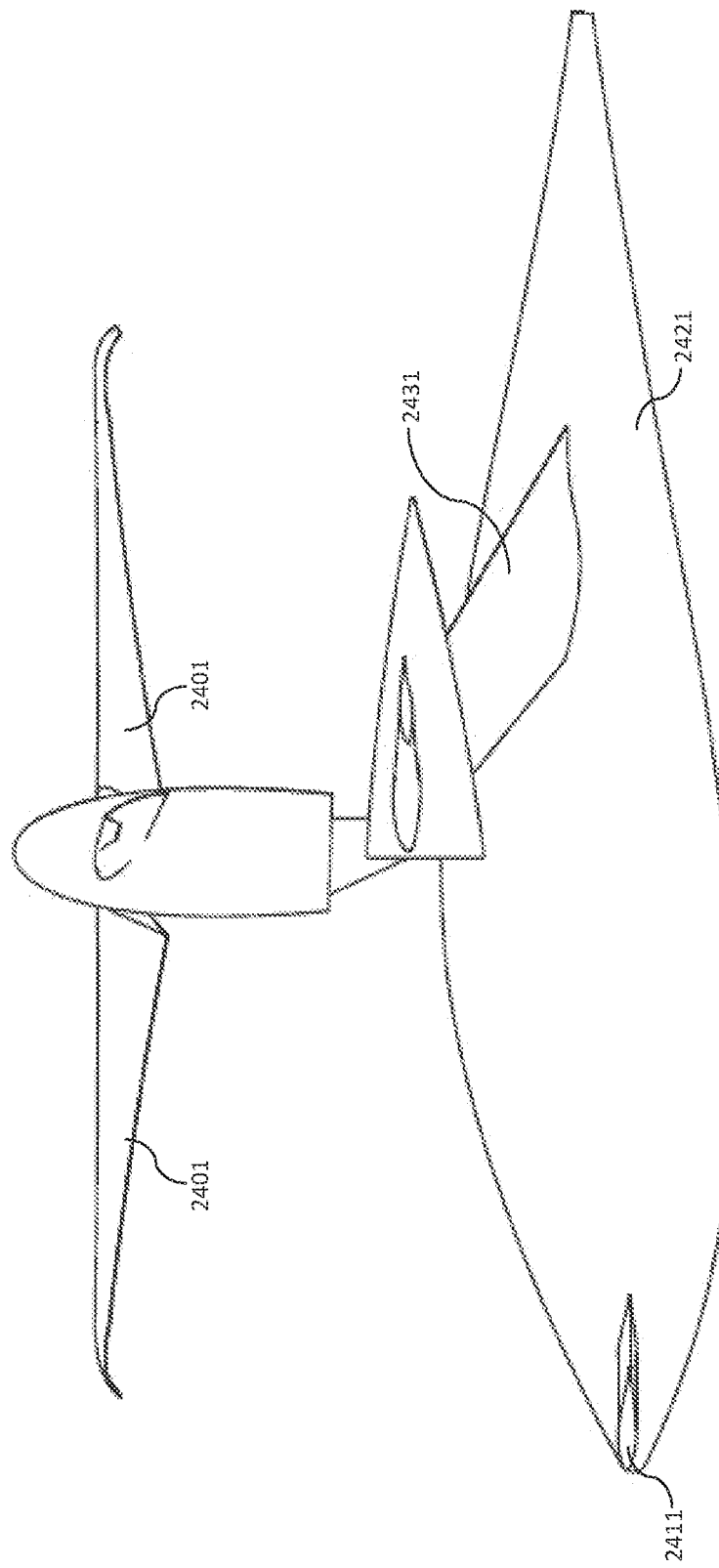
Figure 24G:
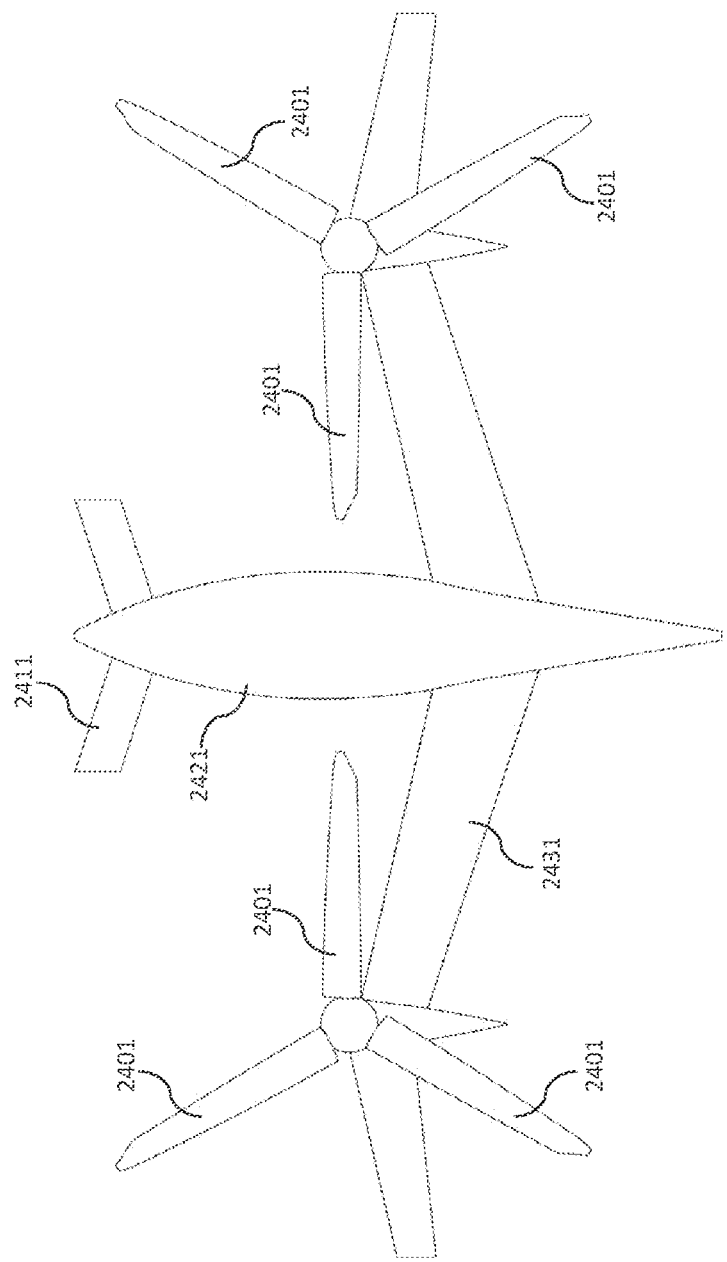

In the preferred embodiment, individual blade control (IBC) actuators 2101 enable precise, independent control of the rotor blade trajectories. By independently controlling the blade angle, the rotor moment and forces can be controlled. FIG. 22 shows a similar to that depicted in FIG. 11, except that first tilting rotor system 2210 and first tilting auxiliary rotor system 2240 are 4-blade rotor applications. Application of IBC actuation with a 4-blade rotor enables aircraft braking (negative rotor thrust) in wingborne flight without introducing large hub moments. All elements similarly numbered as in FIG. 11 are described as above. Details can be found in provisional applications, 62/513,930 (Tigner) "A Propeller Or Rotor In Axial Flight For The Purpose Of Aerodynamic Braking", and 62/513,925 (Tigner) "Use Of Individual Blade Control To Enhance Rotorcraft Power Response Quickness", each of which is incorporated by in its entirety reference herein.

Figure 21B:
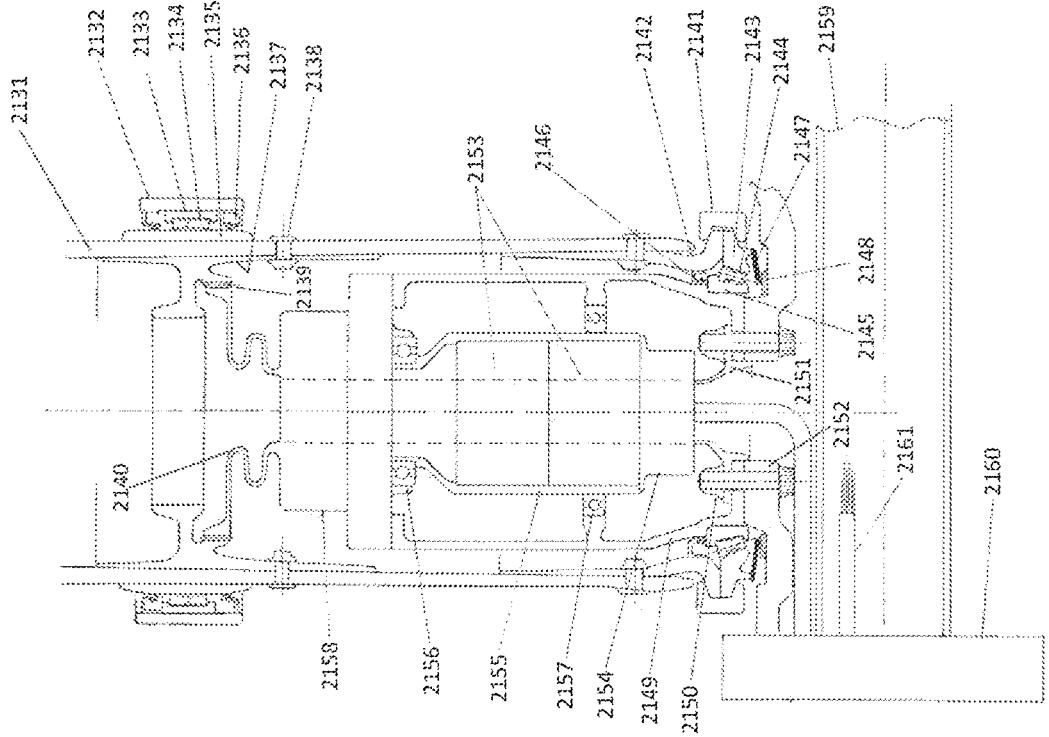
FIG. 21b is a schematic of a vertical cross-section of an alternative preferred individual blade control (IBC) configuration, which can be used with the aircraft of FIG. 11.
Figure 21A:
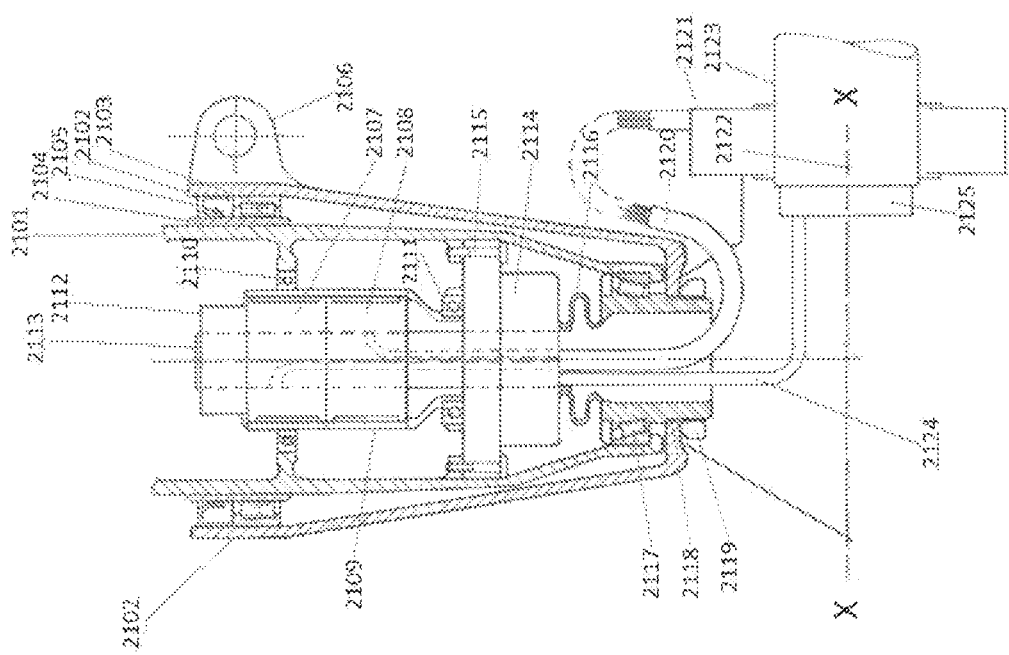
FIG. 21A is a schematic of a vertical cross-section of a preferred individual blade control (IBC) configuration, which can be used with the aircraft of FIG. 11.

A preferred IBC configuration is shown in FIG. 21A. The design approach is to locate an electric actuator within the blade itself, positioned so the actuator and blade feather axes are concurrent. Certain blade design conditions have to be met for this approach to be feasible. OSTR rotor blades should, with great advantage, have a high stiffness in flap bending and lead-lag which leads to blade root section chords and thicknesses much larger than seen in conventional rotor blades. The resultant blade spar, being hollow and of adequate diameter, conveniently accepts the cylindrical electric actuator. In combination with a reduction gearbox, it will be seen that electric motor drive can connect the blade to the hub in a rotational sense without the need for mechanical links and can be commanded and controlled exactly as other flight control actuators. The general term applied to this type of actuation is Individual Blade Control (IBC) which permits an entirely new and optimized matrix of blade azimuth and pitch angle. There are aerodynamic advantages in doing so.

Additionally, military helicopters engaged in ship-borne operations have to be made compact by means of folding. Folding an existing state of the art rotor blade and maintaining the integrity of the pitch linkage results in a complex arrangement of mechanical parts. The subject invention eliminates this complexity; and the only new requirement for the actuator design, being internal to the blade, is that the electrical cabling flexes with the fold angle. This requirement is readily and simply achieved.

Hollow Blade Spar, 2101 is inserted into receiving bore of Hub, 2102 supporting the blade by Bearing, 2103 running on Inner Race, 2104 and sealed by Seal, 2105. If required to fold, the blade and hub portion rotates about Hinge, 2106. Either one Motor Stator, 2107, or, two Motor Stators, 2107 and 2108 operate Rotor, 2109, guided by Tail Bearing, 2110 and Rotor Bearing, 2111. The motor rotors position and hence blade angular position is sensed by Encoder, 2112 with a static reference by means of Stationary Core, 2113. The motors drive the Gearbox, 2114, which is secured to the blade root by Fastenings, 2115. The gearbox reaction torque is carried by Flexible Coupling, 2116. The gearbox reaction torque is carried by Flexible Coupling, 2116, whose purpose is to isolate the gearbox from moment induced deflections resulting from blade flap and lead-lag loads. Centrifugal loads as well as moment-induced radial loads are carried by Taper Roller Bearing, 2117. Blade actuation torque is reacted through Spline, 2117 and the Centrifugal Force is reacted by Nut, 2119. Flexible electrical Connection Cable, 2120 carries motor power and control information from Slip Ring, 2121, which rotates about Hub Rotation Axis, 2122 (shown by Axis X-X) with the static portion of the slip ring supported by Airframe Structure, 2123. The Coolant Fluid flow and return lines, 2124, are fed through Rotary Gland, 2125.

FIG. 21B shows an alternative component layout. If the rotor blade is not required to fold, and the blade feather axis is tightly controlled relative to the hub by means of rigid feather bearings, then the pitch actuator can be hub-mounted as opposed to blade-mounted. In this arrangement, the actuator assembly consisting of motor or motors, the reduction gearbox and the required sensors and connection wiring is connected to the hub. This connection is torsional stiff, but flexible in alignment to accept the deflections inherent in highly-loaded blades. The splined output drive disc mates with an engaging spline internal to the blade. There are practical system advantages in co-mounting a set of actuators on a unitary hub, as they can be electrically connected with common driver, power, and cooling paths.

Cylindrical blade spar, 2131, is supported in the Outboard Feather Bearing Assembly consisting of Bearing Retainer Hoop, 2132, Outer Race, 2133, Rollers and Cage, 2134, Inner Race, 2135, and Seals, 2136. The blade root is stabilized with Inner Diaphragm, 2137, secured with Rivets, 2138. The diaphragm is internally splined at 2139 for torque transfer from the Flexible Drive Bellows, 2140. This is the point of separation when the removed blade is withdrawn over the fixed actuator.

The Split Blade Retaining Clamp, 2141, secures the Inboard Root Fitting, 2142, to the Inboard Feather Bearing Outer Race, 2143. The Taper Roller and Cage, 2144, runs on Inner Race, 2145, sealed by Seal, 2146. Bearing pre-load is provided by Belleville Spring, 2147, operating on Thrust Washer, 2148.

Blade centrifugal force is reacted by Actuator Housing, 2149, retained by Fastener Set, 2150 which also secures Static Core, 2151 to the Rotating Hub Component, 2152. The static core carries both Motor Stator Windings, 2153 and the Position Encoder, 2154. The electric motor Rotor, 2155 is supported in Journal Bearing, 2156 and Tail Bearing, 2157, and drives the Reduction Gearbox, 2158.

A tubular Extension, 2159, attached to airframe structure, non-rotating, carries Slip Ring, 2160, providing current and control signals to the actuator via fixed wiring Harness, 2161.

Battery

The preferred battery installation is shown in the nacelle cross sectional view in FIG. 23A. The battery 2301 is disposed below the wing 2302 and internal to the nacelle 2303. Flight direction is indicated by block arrow B. The aft volume of the nacelle includes sufficient volume to include portions of the cooling system required for the electric propulsion system. Alternatively, the battery 2311 can be contained in the wing structure 2312 as shown in FIG. 23B. The battery 2311 is shown of smaller cross-sectional dimensions than in FIG. 23A but it provides the same volume because it is enclosed by the long wing 2321. The nacelle 2313 can then be significantly smaller and lower drag than in the primary preferred embodiment. Alternatively, a nacelle arrangement with an internal combustion engine and a generator (hybrid propulsion) can be used to power the electric motors and other aircraft systems and provide for a substantially longer range.

Alternative Configuration

FIGS. 24A-G show an alternative preferred embodiment without auxiliary rotors. This preferred embodiment uses the powerful pitch control of the primary rotors 2401 in rotor borne flight and the pitch control of a long control arm canard surface 2411 in wingborne flight to make possible an aircraft with lower weight, drag, installed power and cost, providing the same aircraft performance but with reduced aircraft control in transition and in wind gust and reduced level of accommodation of C.G. shift and payload versatility (no cargo ramp and reduced luggage volume and weight) as compared to the preferred embodiment with the auxiliary rotors and large tail area.

The alternative preferred embodiment features a fuselage 2421, wing 2431, rotor blades 2401, and canard 2411. The internal configuration is similar to the primary preferred embodiment. The fuselage has 3 rows of seating: front row 2501, middle row 2502, and aft row 2503.

While the cabin volume of the 2-rotor alternative configuration is comparable to that of the one with the 4 rotors, its wingborne drag is reduced by: a) wing area reduced from 250 Ft^2 to 140 Ft^2, b) no tail section, c) no auxiliary rotor nacelles, d) wing to fuselage attachment behind the cabin (lower frontal area), e) option for extensive fuselage laminar flow, and f) lower cruise drag due to lower cruise weight (estimated as 817 Lb lighter due to a lighter airframe and smaller battery).

FIGS. 25A and 25B show the inboard profile of the 2-rotor alternative configuration demonstrating a 3-row seating comparable to that of the 4 rotors configuration. FIG. 26 is a table of dimensions and parameters of the 2-rotor alternative configuration.

Modifications

It should be apparent to those skilled in the art that many more modifications besides those already described are possible without departing from the inventive concepts herein. The inventive subject matter, therefore, is not to be restricted except in the spirit of the appended claims.

What is claimed is:

1. An electric powered VTOL aircraft capable of carrying a payload of at least 500 pounds, comprising:
    a fuselage;
    at least one wing mechanically coupled to the fuselage;
    a first nacelle mechanically coupled to the at least one wing on a first side of the fuselage and having a first static portion that is fixed with respect to the at least one wing and a first tilting portion that is tiltable with respect to the at least one wing;
    first and second electric motors mechanically coupled to the first tilting portion and configured to tilt with the first tilting portion;
    a first rotor mechanically coupled to the first tilting portion and configured to tilt with the first tilting portion, wherein the first and second electric motors are configured to rotate the first rotor;
    a first battery configured to power the first electric motor; and
    a second battery configured to power the second electric motor;
    wherein the first battery is located in one of the first nacelle or the at least one wing.

2. The electric powered VTOL aircraft of claim 1, wherein the second battery is located in the other of the first nacelle or the at least one wing.

3. The electric powered VTOL aircraft of claim 1, wherein the first battery is located in the at least one wing.

4. The electric powered VTOL aircraft of claim 3, wherein the first battery is longer in a direction perpendicular to the fuselage than in a direction parallel to the fuselage.

5. The electric powered VTOL aircraft of claim 1, wherein the first battery is located in the first nacelle.

6. The electric powered VTOL aircraft of claim 5, wherein the first battery is longer in a direction parallel to the fuselage than in a direction perpendicular to the fuselage.

7. The electric powered VTOL aircraft of claim 1, wherein the first rotor is configured to tilt with respect to the first static portion of the first nacelle by at least 70°.

8. The electric powered VTOL aircraft of claim 1, further comprising:
    a second rotor, a third rotor, and a fourth rotor.

9. The electric powered VTOL aircraft of claim 8, wherein three of the first rotor, the second rotor, the third rotor, and the fourth rotor are capable of providing at least 70% of a lifting force required to lift the electric powered VTOL aircraft carrying the payload of at least 500 pounds.

10. The electric powered VTOL aircraft of claim 8, further comprising:
    a tail mechanically coupled to the fuselage, wherein the second rotor is mechanically coupled to the at least one wing on a second side of the fuselage;
    the third rotor is mechanically coupled to the tail on the first side of the fuselage; and
    the fourth rotor is mechanically coupled to the tail on the second side of the fuselage.

11. The electric powered VTOL aircraft of claim 10, wherein:
    the third rotor is mechanically coupled to a first end of the tail on the first side of the fuselage; and
    the fourth rotor is mechanically coupled to a second end of the tail on the second side of the fuselage.

12. The electric powered VTOL aircraft of claim 10, wherein
    the second rotor is tiltable with respect to the at least one wing;
    the third rotor is tiltable with respect to the tail; and
    the fourth rotor is tiltable with respect to the tail.

13. The electric powered VTOL aircraft of claim 11, further comprising:
    a second nacelle mechanically coupled to the at least one wing on a second side of the fuselage and having a second static portion that is fixed with respect to the at least one wing and a second tilting portion that is tiltable with respect to the at least one wing;
    third and fourth electric motors mechanically coupled to the second tilting portion and configured to tilt with the second tilting portion;
    a second rotor mechanically coupled to the second tilting portion and configured to tilt with the second tilting portion, wherein the third and fourth electric motors are configured to rotate the second rotor;
    a third battery configured to power the third electric motor; and
    a fourth battery configured to power the fourth electric motor;
    wherein the third battery is located in one of the second nacelle or the at least one wing.

14. The electric powered VTOL aircraft of claim 13, wherein the fourth battery is located in the other of the second nacelle or the at least one wing.

15. The electric powered VTOL aircraft of claim 11, wherein the first battery comprises one of a Li-ion battery, Li-Polymer battery, or Li-chemical battery.

16. The electric powered VTOL aircraft of claim 11, wherein the first battery comprises a specific energy density of about 100 kWh/lb.

17. A method of operating an electric powered VTOL aircraft capable of carrying a payload of at least 500 pounds, the electric powered VTOL aircraft having a fuselage, at least one wing mechanically coupled to the fuselage, a first nacelle mechanically coupled to the at least one wing on a first side of the fuselage and having a first static portion that is fixed with respect to the at least one wing and a first tilting portion that is tiltable with respect to the at least one wing, first and second electric motors mechanically coupled to the first tilting portion and configured to tilt with the first tilting portion, a first rotor mechanically coupled to the first tilting portion and configured to tilt with the first tilting portion, a first battery located in one of the first nacelle or the at least one wing and configured to power the first electric motor, a second battery configured to power the second electric motor, wherein the first and second electric motors are configured to rotate the first rotor, the method comprising:
    in flight, rotating the first rotor by the first electric motor and the second electric motor,
    powering the first electric motor by the first battery; and
    powering the second electric motor by the second battery.

18. The method of claim 17, wherein the second battery is located in the other of the first nacelle or the at least one wing.

19. The method of claim 17, wherein the first battery is located in the at least one wing.

20. The method of claim 19, wherein the first battery is longer in a direction perpendicular to the fuselage than in a direction parallel to the fuselage.

21. The method of claim 17, wherein the first battery is located in the first nacelle.

22. The method of claim 21, wherein the first battery is longer in a direction parallel to the fuselage than in a direction perpendicular to the fuselage.

23. The method of claim 17, further comprising tilting the first rotor with respect to the first static portion of the first nacelle by at least 70°.

24. The method of claim 17, wherein the electric powered VTOL aircraft further comprises:
a second rotor, a third rotor, and a fourth rotor.

25. The method of claim 24, wherein three of the first rotor, the second rotor, the third rotor, and the fourth rotor are capable of providing at least 70% of a lifting force required to lift the electric powered VTOL aircraft carrying the payload of at least 500 pounds.

26. The method of claim 24, wherein the electric powered VTOL aircraft further comprises:
a tail mechanically coupled to the fuselage, wherein
the second rotor is mechanically coupled to the at least one wing on a second side of the fuselage;
the third rotor is mechanically coupled to the tail on the first side of the fuselage; and
the fourth rotor is mechanically coupled to the tail on the second side of the fuselage.

27. The method of claim 26, wherein:
the third rotor is mechanically coupled to a first end of the tail on the first side of the fuselage; and
the fourth rotor is mechanically coupled to a second end of the tail on the second side of the fuselage.

28. The method of claim 26, wherein
the second rotor is tiltable with respect to the at least one wing;
the third rotor is tiltable with respect to the tail; and
the fourth rotor is tiltable with respect to the tail.

29. The method of claim 27, wherein the electric powered VTOL aircraft further comprises:
a second nacelle mechanically coupled to the at least one wing on a second side of the fuselage and having a second static portion that is fixed with respect to the at least one wing and a second tilting portion that is tiltable with respect to the at least one wing;
third and fourth electric motors mechanically coupled to the second tilting portion and configured to tilt with the second tilting portion;
a second rotor mechanically coupled to the second tilting portion and configured to tilt with the second tilting portion, wherein the third and fourth electric motors are configured to rotate the second rotor;
a third battery located in one of the second nacelle or the at least one wing and configured to power the third electric motor; and
a fourth battery configured to power the fourth electric motor;
the method further comprising:
in flight, rotating the second rotor by the third electric motor and the fourth electric motor,
powering the third electric motor by the third battery; and
powering the fourth electric motor by the fourth battery.

30. The method of claim 29, wherein the fourth battery is located in the other of the second nacelle or the at least one wing.

* * * * *